United States Patent
Harris et al.

(10) Patent No.: US 10,871,702 B2
(45) Date of Patent: *Dec. 22, 2020

(54) AERIAL VEHICLE DESCENT WITH DELIVERY LOCATION IDENTIFIERS

(71) Applicant: Amazon Technologies, Inc., Seattle, WA (US)

(72) Inventors: Scott Raymond Harris, Bainbridge Island, WA (US); Stephen Thomas Safarik, Seattle, WA (US); Paul Viola, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/110,073

(22) Filed: Aug. 23, 2018

(65) Prior Publication Data

US 2018/0364546 A1   Dec. 20, 2018

Related U.S. Application Data

(63) Continuation of application No. 14/863,873, filed on Sep. 24, 2015, now Pat. No. 10,088,736.

(51) Int. Cl.
*G03B 15/00* (2006.01)
*H04N 7/18* (2006.01)
(Continued)

(52) U.S. Cl.
CPC ......... *G03B 15/006* (2013.01); *G06K 9/0063* (2013.01); *G06K 9/46* (2013.01);
(Continued)

(58) Field of Classification Search
None
See application file for complete search history.

(56) References Cited

U.S. PATENT DOCUMENTS 6,348,918 B1 * 2/2002 Szeliski ............... G06T 7/593
                                                    345/419
9,336,506 B2 * 5/2016 Shucker ............. G06Q 10/083
(Continued)

FOREIGN PATENT DOCUMENTS

WO   2015017855 A1   2/2015

OTHER PUBLICATIONS

Meng Cai et al, "Homography-based depth recovery with descent images", vol. 24, No. 5, Apr. 5, 2013, pp. 1093-1106 (Year: 2013).*
(Continued)

*Primary Examiner* — Dave Czekaj
*Assistant Examiner* — Shanika M Brumfield
(74) *Attorney, Agent, or Firm* — Athorus, PLLC

(57) ABSTRACT

Described are systems and methods for surveying a destination as an unmanned aerial vehicle ("UAV") descends toward the destination. To confirm that the destination is clear of objects and includes a safe landing or delivery location, such as a substantially planar surface, the UAV may capture and process images at different altitudes during the descent. Feature points of a first image captured at a first altitude may be paired with feature points of a second image captured at a second, different altitude. A homography may be computed to confirm that the paired feature points lie in the same plane and then the two images may be registered based on the paired feature points. The registered images may then be processed to determine depth information and determine if descent of the UAV is to continue or be aborted.

18 Claims, 17 Drawing Sheets

(51) Int. Cl.
*G06K 9/46* (2006.01)
*G06Q 10/08* (2012.01)
*G06K 9/00* (2006.01)
*G06T 7/33* (2017.01)
*G06T 7/50* (2017.01)

(52) U.S. Cl.
CPC ..... *G06K 9/4604* (2013.01); *G06Q 10/08355* (2013.01); *G06T 7/33* (2017.01); *G06T 7/50* (2017.01); *H04N 7/183* (2013.01)

(56) References Cited

U.S. PATENT DOCUMENTS

| | | | | |
|---|---|---|---|---|
| 9,412,280 | B1* | 8/2016 | Zwillinger | G08G 5/0069 |
| 10,339,663 | B2* | 7/2019 | Barajas Hernandez | G06K 9/00637 |
| 2004/0109585 | A1* | 6/2004 | Tao | G06T 7/579 382/106 |
| 2012/0148097 | A1* | 6/2012 | Park | G06K 9/00335 382/103 |
| 2014/0064624 | A1* | 3/2014 | Kim | G06K 9/0063 382/201 |
| 2014/0212027 | A1* | 7/2014 | Hallquist | G06F 3/1415 382/154 |
| 2015/0062117 | A1 | 3/2015 | Reitmayr | |
| 2015/0317597 | A1* | 11/2015 | Shucker | G06Q 10/083 235/375 |
| 2016/0033966 | A1* | 2/2016 | Farris | A47G 29/122 701/15 |
| 2016/0078299 | A1* | 3/2016 | Nerayoff | H04N 7/181 705/13 |
| 2016/0122038 | A1* | 5/2016 | Fleischman | G06T 7/73 701/2 |
| 2016/0189101 | A1* | 6/2016 | Kantor | G08G 5/0013 705/338 |
| 2016/0257424 | A1* | 9/2016 | Stabler | A63H 27/12 |
| 2016/0300492 | A1* | 10/2016 | Pasko | G08G 5/0086 |
| 2017/0084037 | A1* | 3/2017 | Barajas Hernandez | G06K 9/4671 |

OTHER PUBLICATIONS

Bosch, Sebastien, et al., "Autonomous Detection of Safe Landing Areas for an UAV from Monocular Images", IEEE/RSJ International Conference on Intelligent Robots and Systems, Oct. 9, 2006; pp. 5522-5527, 6 pages.

Amintabar, Amirhasan et al, "Homography-based plane identification and matching", 15th IEEE International Conference of Image Processing: ICIP 2008; San Diego, California USA, Oct. 12-15, 2008, IEEE, Piscataway, NJ, USA, Oct. 12, 2008 (Oct. 12, 2008), pp. 297-300.

Amirhasan Amintabar et al: "Homography-based plane identification and matching", 15th IEEE International Conference of Image Processing: ICIP 2008; San Diego, California USA, Oct. 12-15, 2008, IEEE, Piscataway, NJ, USA, Oct. 12, 2008 (Oct. 12, 2008), pp. 297-300.

International Search Report for PCT Application No. PCT/US2016/053198 dated Dec. 15, 2016.

Meng Cai et al., "Homography-based depth recovery with descent images", vol. 24, No. 5, Apr. 5, 2013, pp. 1093-1106.

Olivares-Mendez, Miguel A. et al.: "Autonomous Landing of an Unmanned Aerial Vehicle using Image-Based Fuzzy Control", Proceedings of the 17th World Congress the International Federation of Automatic Control; Seoul, Korea; Jul. 6-11, 2008, vol. 46, No. 30, Jan. 1, 2013 (Jan. 1, 2013), pp. 79-86.

Tan Ho et al.: "Object Removal in Multi-view Images using Disparity Layering and Piecewise Homography", Proceedings of the International Conference on Electrical and Computer Systems Ottawa, Aug. 24, 2012 (Aug. 24, 2012), pp. 22-24.

* cited by examiner

AERIAL VEHICLE DESCENT WITH DELIVERY LOCATION IDENTIFIERS

PRIORITY CLAIM

This application is a continuation of and claims priority to U.S. application Ser. No. 14/863,873, filed Sep. 24, 2015, entitled "Unmanned Aerial Vehicle Descent," which is incorporated herein by reference in its entirety.

BACKGROUND

Physical delivery of items to user specified delivery destinations has improved dramatically over the years, with some retailers offering next day delivery of ordered items. The final or last mile delivery of physical items to a user specified destination is traditionally accomplished using a human controlled truck, bicycle, cart, etc. For example, a user may order an item for delivery to their home (delivery destination). The item may be picked from a materials handling facility, packed, and shipped to the customer for final delivery by a shipping carrier. The shipping carrier will load the item onto a truck that is driven by a human to the delivery destination and the human driver, or another human companion with the driver, will retrieve the item from the truck and complete the delivery to the destination. For example, the human may hand the item to a recipient, place the item on the user's porch, store the item in a post office box, etc.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
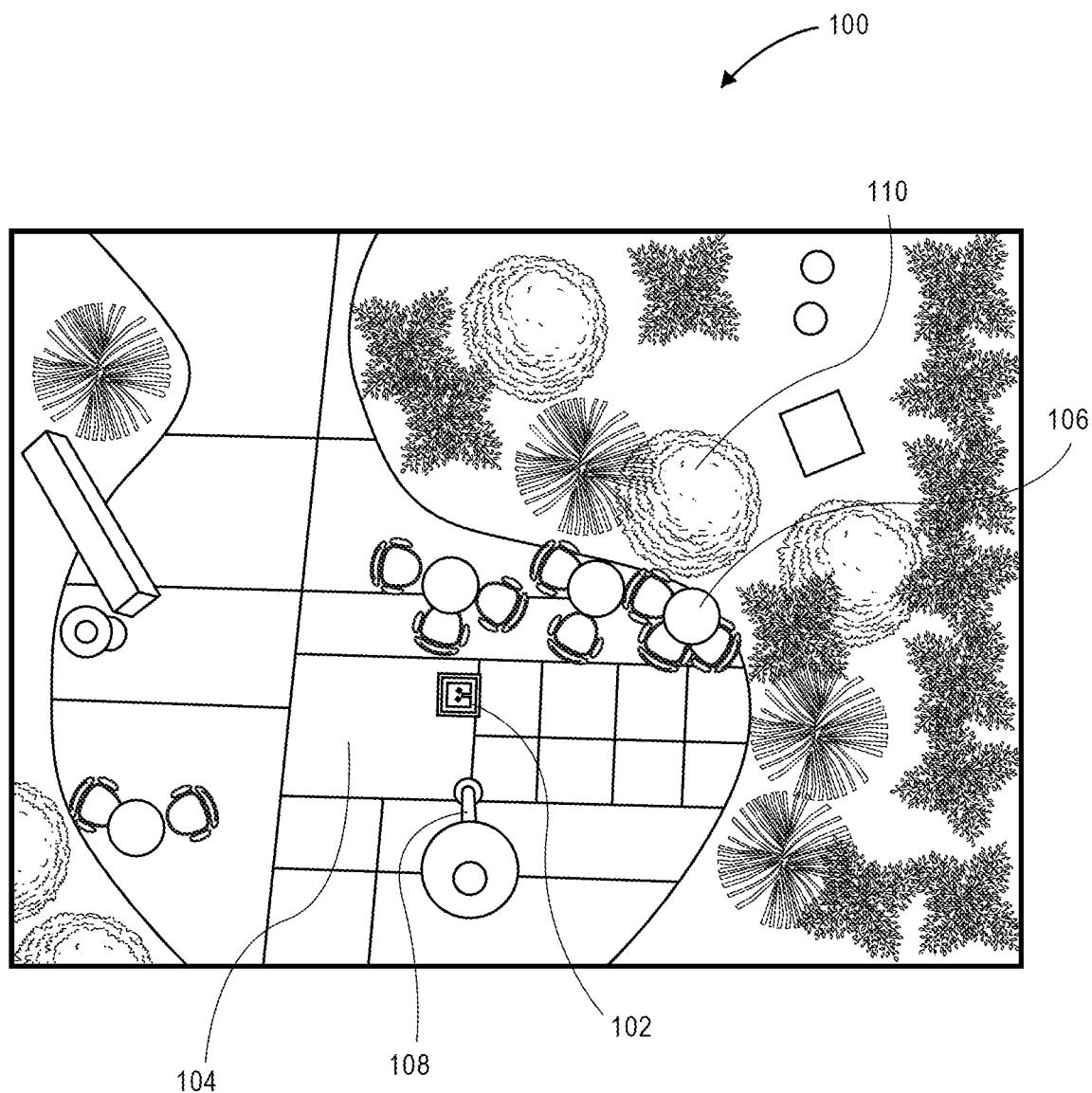
FIG. 1 depicts a representation of an image of a destination, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes methods and systems for surveying a destination as an unmanned aerial vehicle ("UAV") descends toward the destination. The destination may be a landing destination, a delivery destination at which a payload is to be delivered, etc. To confirm that the destination is clear of objects and includes a safe landing or delivery location, such as a substantially planar surface, the UAV may capture and process images at different altitudes during the descent.

For example, feature points of a first image captured at a first altitude may be paired with feature points of a second image captured at a second, different altitude. A homography may be computed for each paired feature point to confirm that the feature points are properly paired. A homography will exist if the two feature points are on the same plane (e.g., both feature points are on the ground). A homography will not exist between the paired feature points if the feature points are not on the same plane (e.g., the first feature point is on the ground and the second feature point is on a chair).

Paired feature points that do not have a homography are discarded. Paired feature points that do have a homography are used to register the first image and the second image to form a registered image set. The registered image set is then used to generate a depth disparity map of the destination that provides an indication of objects at different distances from the UAV (i.e., objects in different planes). The depth disparity map may then be utilized to confirm whether objects are within the destination and/or whether there is a substantially planar surface available at the destination and of a size sufficient for the UAV to land, deliver a payload (e.g., package), etc.

In some implementation, a location identifier (also referred to herein as a delivery location identifier) may be positioned at the destination and used to aid the UAV in the descent and used in the processing of images obtained by UAV during descent. For example, a user may be provided with a delivery location identifier ("DLI") that is to be placed at a delivery location within a destination to identify where a UAV is to position an item as part of a delivery to the destination. For example, the delivery destination may be a user's home. Within the deliver destination of the user's home, the user may select a delivery location, such as a spot in the back yard where the UAV is to deliver the ordered item (payload) as part of the delivery.

To identify the delivery location, the user may physically place a DLI at the delivery location. When the UAV arrives at the delivery destination with the item, the UAV will identify the DLI and position the item at or near the DLI to complete the delivery of the item. The DLI may include a unique identifier that can be used in selecting feature points and registering images obtained at different altitudes during descent. Likewise, the depth disparity map may be fit to a three-dimensional plane such that objects in approximately the same plane are represented together and objects that are not in that plane are distinguished. The UAV may then determine if there is an area within the plane of the DLI that is of a sufficient size to enable safe delivery of the ordered item. If an area of a sufficient size is detected, the UAV will continue descent toward the area and position the item within the detected area. However, if it is determined that an area of sufficient size to safely deliver the item does not exist, the UAV will stop descent toward the destination and either find an area at which delivery is possible (e.g., includes a substantially planar surface for item delivery), abort delivery of the item, or take other actions.

As used herein, a "destination" refers to a place or area to which a payload is to be delivered, and/or a place or area at which a UAV is to land or descend below a defined altitude (e.g., twenty feet). In some implementations, the destination corresponds to a position of a location identifier (e.g., DLI), or a portion of the destination surrounding or adjacent to the position of the location identifier.

A location identifier may be any physical object that may be positioned at a destination. For example, a location identifier may include a visual identifier, a sound identifier, and/or a radio frequency identification ("RFID") tag. In some implementations, the user may create a temporary location identifier. For example, the user may be sent an electronic file that includes a representation of a visual identifier. The user may print a physical representation of the visual identifier on a piece of paper using a standard printer, a three-dimension printer (3D printer), etc. In other implementations, the location identifier may be an object that is sent to the user. In such an implementation, the location identifier may include a visual identifier, a sound identifier, and/or a RFID tag. In some implementations, the location identifier may provide both identification and a landing area for the UAV. For example, the location identifier may be a large flat surface (e.g., three feet wide, three feet long, and one inch thick) upon which the location identifier can land and/or place a package for delivery.

A visual identifier may be any visually identifiable indicator. For example, a visual identifier may be a quick response ("QR") code, barcode, bokode, character, symbol, color, shape, size, light pattern, etc. A visual identifier may also be presented in any light spectrum that is detectable by a UAV, such as the visible light spectrum, the infrared light spectrum, etc. In some implementations, the visual identifier may be unique to the order, unique to the user, unique to the delivery destination, unique to the location identifier, or any combination thereof. Likewise, the visual identifier may in some implementation be used to determine orientation. For example, the visual identifier may include a detectable shape that can be used to orient or align the UAV with respect to the shape of the visual identifier.

While the examples discussed herein describe the delivery of a physical object, a digital item may likewise be delivered using one or more of the implementations described herein. For example, a user may order a digital item (e.g., video, audio, electronic book, map) and request that the digital item be delivered via UAV. Using the implementations discussed herein, the digital item may be stored in memory of the UAV, and the UAV may navigate to a destination, descend to a defined altitude, and transmit the digital item to the user or a device (e.g., cell phone, tablet, or laptop) of the user. For example, the UAV may join and/or create a wireless network through which the digital item may be transmitted. In one example, the UAV may establish a local wireless network that the user may temporarily join to receive a transmission of the digital item. In another example, the UAV may join an existing wireless network (e.g., the user's Wi-Fi network) and transmit the digital item to the user's device.

FIG. 1 depicts a representation of an image 100 of a destination, according to an implementation. The image is obtained using an image capture device (e.g., camera) of the UAV (not shown) that is descending toward the destination. As illustrated, the destination may include multiple objects such as a patio 104, lamp 108, tables and chairs 106, and plants 110. Rather than attempting to utilize a stereo cameras or depth sensors to determine the different depths of objects at the destination, the implementations discussed herein utilize multiple images obtained at different altitudes and/or different positions to determine if a substantially planar surface exists at the destination of a size sufficient to safely land, delivery a payload, or descend for payload delivery. This simplified determination improves the speed and accuracy in determining whether continued descent of the UAV is safe.

As illustrated in FIG. 1, in some implementations, a location identifier 102 may be positioned at the destination and used by the UAV to determine the destination and used in processing images, as discussed in further detail below. While the examples discussed herein illustrate a patio with tables, chairs, and lamps, surrounded by landscaping (e.g., trees, bushes), it will be appreciated that the destination may be any area or location and any number, type, variety, and/or position of objects may be present. Likewise, images of the destination may be periodically obtained and processed during descent toward a destination to detect any objects entering or existing the destination. For example, if an animal (e.g., pet, human) enters the destination, the implementations discussed herein will detect the presence of the animal and stop a descent of the UAV.

Figure 2:
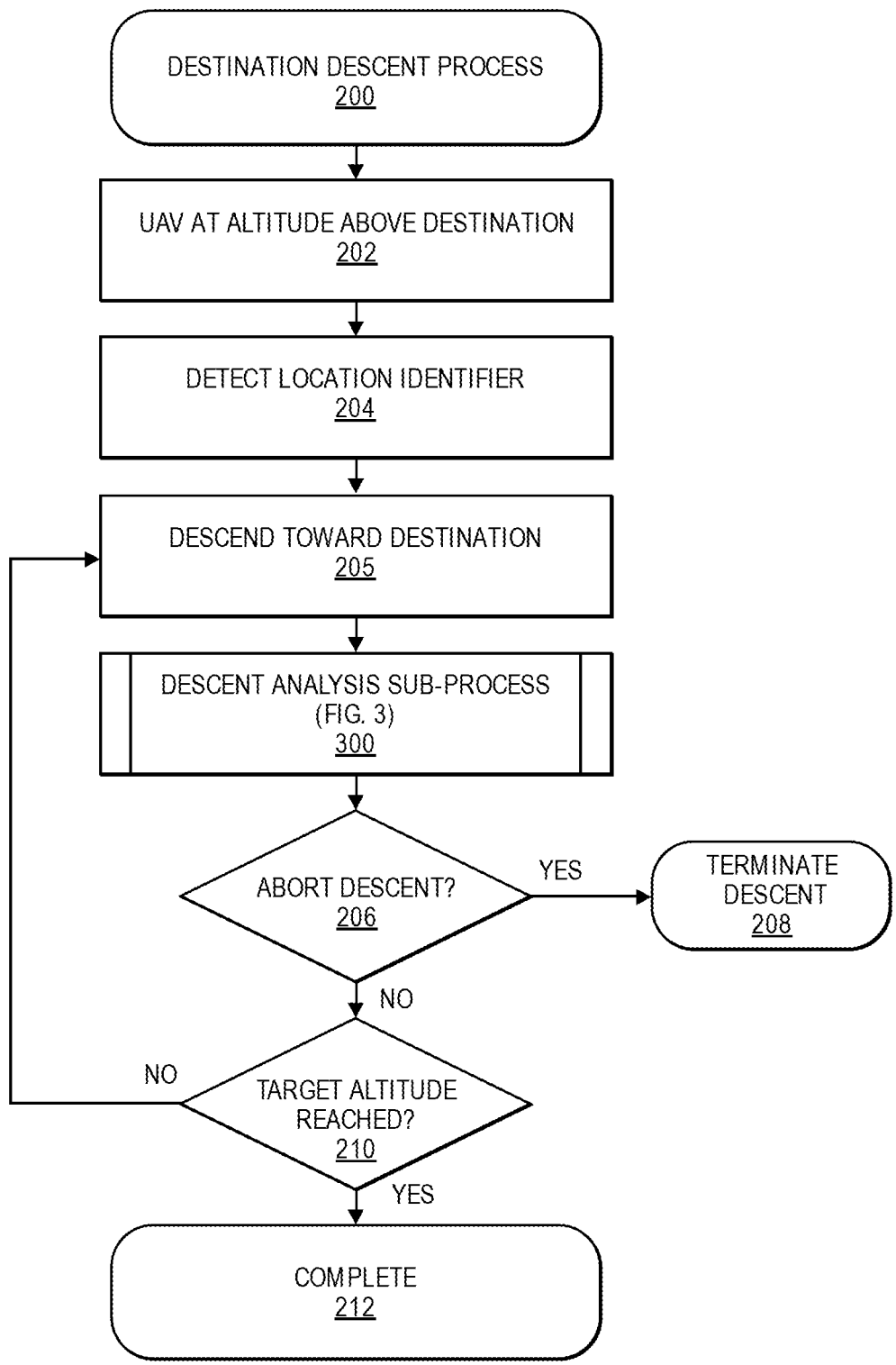
FIG. 2 is a flow diagram illustrating an example destination descent process, according to an implementation.

FIG. 2 is a flow diagram illustrating an example destination descent process 200, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 200 begins when the UAV is positioned at an altitude above a destination, as in 202. For example, the UAV may be provided coordinates of a destination and the UAV may aerially navigate to those coordinates. When the UAV arrives at the destination, it is at an altitude above the destination such that it must descend to the destination to land, complete delivery of a payload, etc. In some implementations, the descent may include landing the UAV at the destination. In other implementations, the descent may be to a defined altitude (e.g., ten feet) above the destination.

When the UAV is positioned at an altitude above the destination, it may detect a location identifier, as in 204. As discussed above, a location identifier, such as a DLI, may be positioned at a destination to aid in the positioning, descent, delivery, etc. at the destination. The location identifier may be detected using image analysis to visually detect the position of the location identifier; the UAV may receive a signal that is transmitted by the location identifier, etc. In some implementations, a location identifier may not be present at the destination.

Upon detecting the location identifier, or if no location identifier is present, the UAV begins descending toward the destination, as in 205. As the UAV descends, the descent analysis sub-process 300 is performed to determine if descent of the UAV is to continue or if descent is to be aborted. The descent analysis sub-process 300 is discussed in further detail below with respect to FIGS. 3A-3B. The descent analysis sub-process returns either an abort notification or an all clear notification.

Based on the result returned by the descent analysis sub-process 300, a determination is made as to whether the descent of the UAV is to be aborted, as in 206. For example, if the descent analysis sub-process 300 returns an abort notification, it is determined at decision block 206 to abort descent of the UAV. If it is determined that descent of the UAV is to be aborted, the descent of the UAV is terminated, as in 208. In some implementations, the UAV may ascend to a defined altitude (e.g., fifty feet) so that it is above any potential objects that could be harmed or otherwise impacted. In other implementations, the UAV may hover at its current altitude. In some implementations, the UAV may search for and restart descent at a different location within the destination. In other implementations, a human operator may be notified and the human operator may assist in the descent of the UAV to the destination. For example, the UAV may transmit images of the destination to a human operator that controls the UAV as the UAV descends toward the destination.

If it is determined at decision block 206 that descent of the UAV is not be aborted, a determination is made as to whether the UAV has reached a target altitude, as in 210. The target altitude may be that the UAV has landed at the destination. Alternatively, the target altitude may be a defined altitude above the destination (e.g., five feet) such that the UAV can deliver a payload at the destination.

If it is determined that the target altitude has not been reached, the example process 200 returns to block 205 and continues. If it is determined that the UAV has reached a target altitude, the example process 200 completes, as in 212.

Figure 3A:
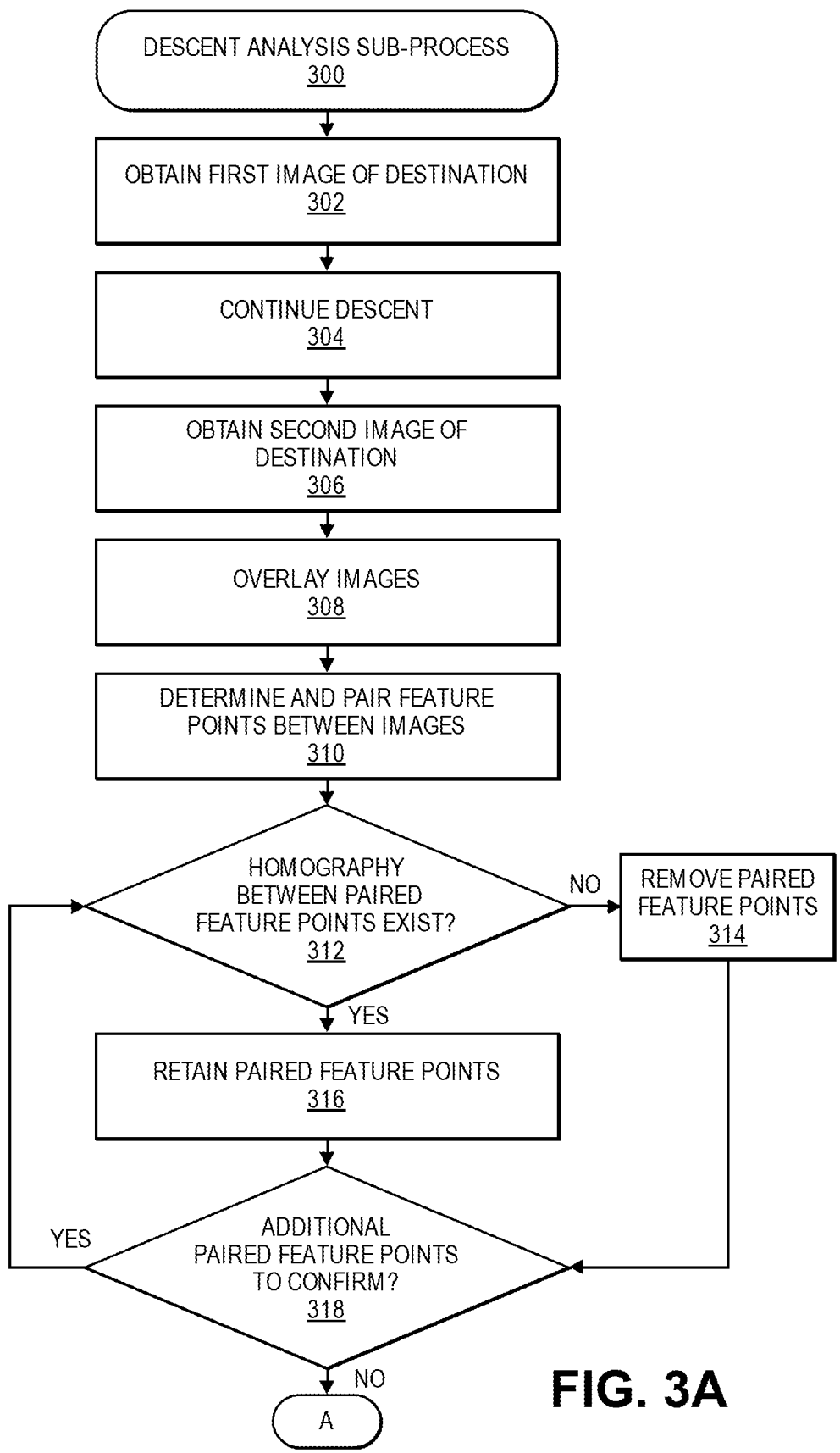
FIGS. 3A-3B are a flow diagram illustrating an example descent analysis sub-process, according to an implementation.
Figure 3B:
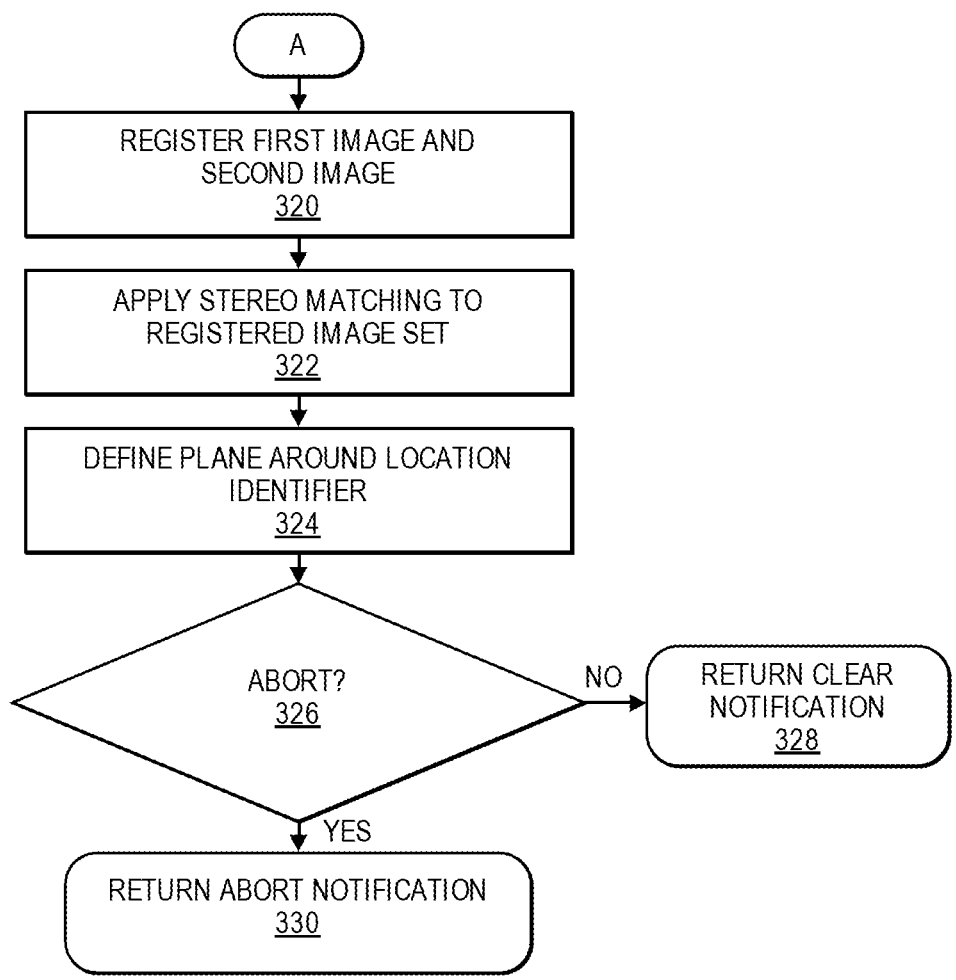

FIGS. 3A-3B are a flow diagram illustrating an example descent analysis sub-process 300, according to an implementation. The example sub-process 300 begins by obtaining a first image at a first altitude and/or first pose (position and orientation) during a descent of the UAV toward a destination, as in 302. The image may be obtained using any type of image capture device. For example, the image capture device may be a standard red, green, blue (RGB) camera, a digital camera, frames from a video camera, an infrared camera, etc.

After obtaining a first image at the first altitude and/or first pose, the UAV continues descent toward the destination, as in 304. After a defined period of time (e.g., three seconds), after the UAV has descended a defined amount (e.g., ten feet), and/or after the pose of the camera of the UAV has been altered, a second image of the destination is obtained, as in 306. The second image may be obtained after any defined period of time, after any defined amount of descent and/or after any defined amount of pose alteration. The pose of the camera may be adjusted by, for example, altering the yaw of the UAV between the first image and the second image. Regardless of the change in altitude and/or pose, the image of the destination must include a similar area so that feature points between the images can be paired and used to register the two images, as discussed below.

Figure 4:
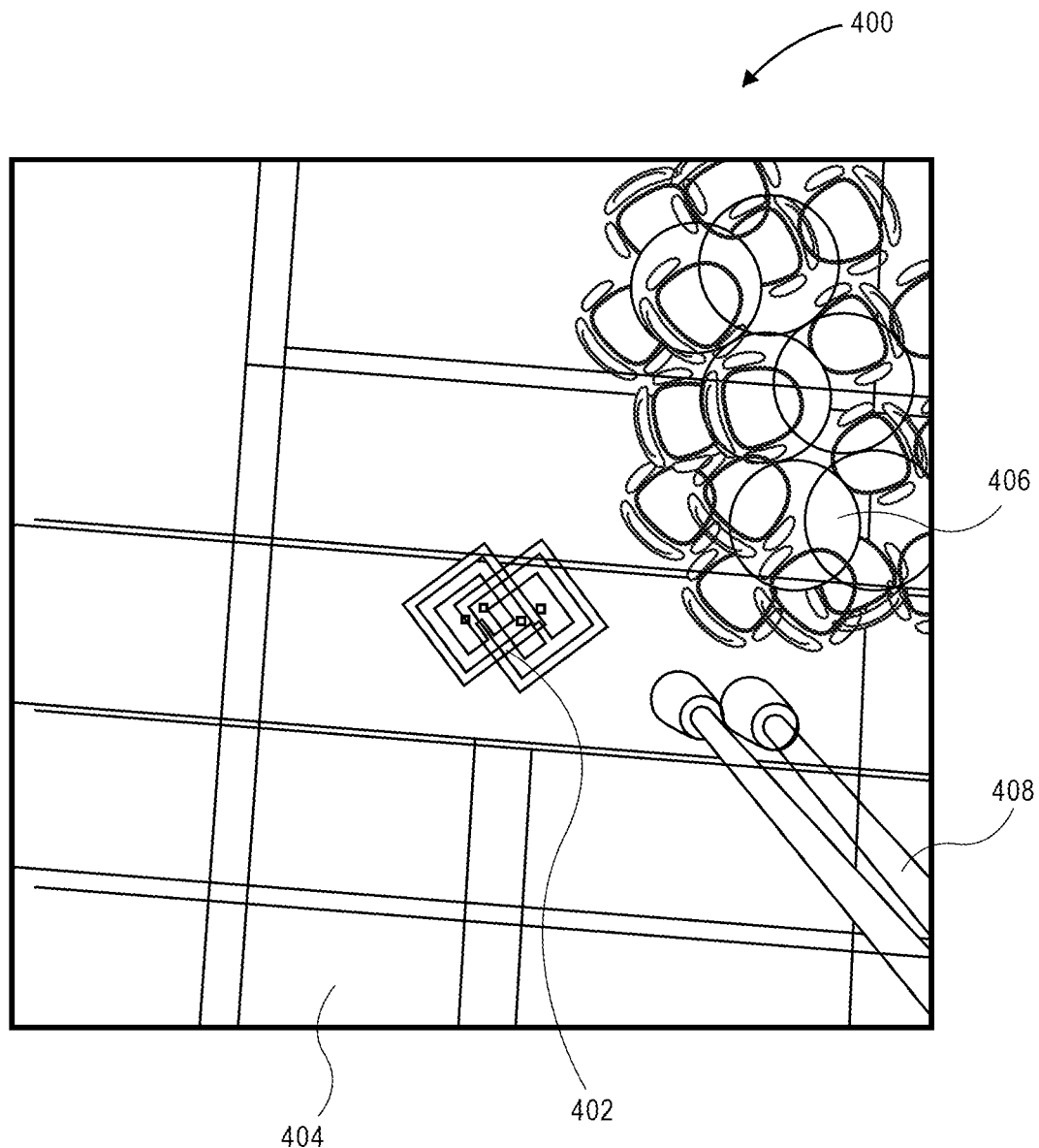
FIG. 4 depicts a representation of a first image of a destination overlaid with a second image of the destination, according to an implementation.

The first image and the second image are then overlaid, as in 308. For example, referring to FIG. 4, illustrated is a representation 400 of a first image of a destination overlaid with a second image of the destination, according to an implementation. As illustrated, the two images do not align because they were taken at different times from different altitudes and different camera pose. For example, the table and chairs 406 represented in the two images are offset with respect to one another. Likewise, the location identifier 402, the lamp 408, and the patio tiles 404 represented in the two images are offset. In some implementations, the size of the objects represented in the two images may be slightly different as well, because the image capture device is closer to the objects when the second image is captured, as a result of the UAV continuing to descend. Because the two images were obtained from different positions and altitudes, the two images cannot be aligned without further processing.

Returning to FIG. 3A, feature points of the first image are determined and paired with corresponding feature points of the second image to form paired feature points, as in 310. Feature points of each image may be determined using any feature point detection algorithm, such as an edge detection algorithm, a center point detection algorithm, an object detection algorithm, etc. Determined points between each image may be paired based on the feature descriptors and/or feature vectors generated of each feature point. For example, feature points may be paired based on a similarity or commonality between feature descriptors. Any number of paired feature points may be formed from the two images. In some implementations, a representation of the location identifier included in the first image and the second image may be determined and corresponding feature points of the location identifier may be paired between the two images.

Figure 5:
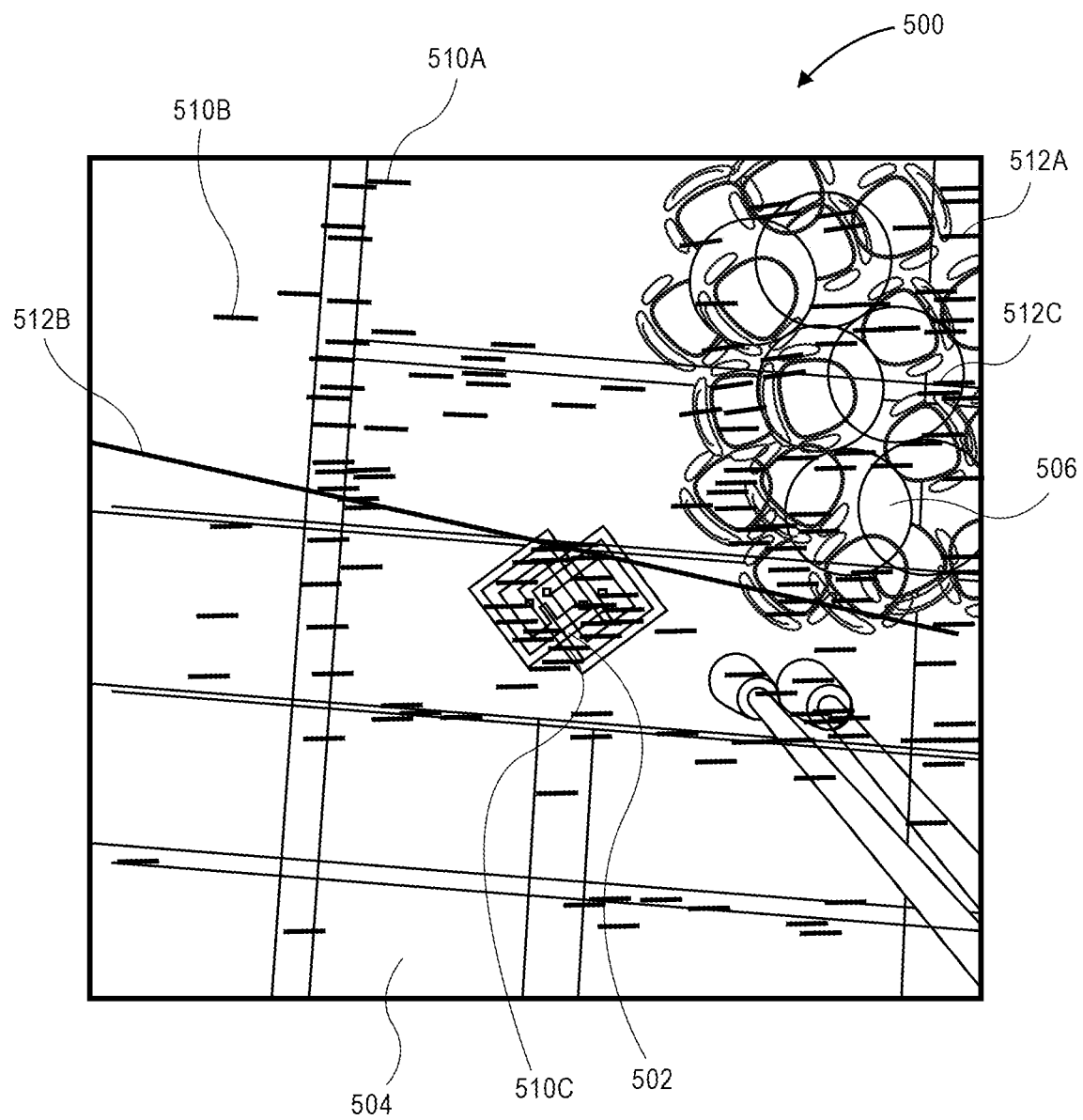
FIG. 5 depicts a representation of the first image of the destination overlaid with the second image of the destination with paired feature points, according to an implementation.

For example, FIG. 5 depicts a representation 500 of the first image of the destination overlaid with the second image of the destination with paired feature points 510, 512, according to an implementation. As illustrated by the lines connecting the paired feature points, any number of paired feature points may be determined between two images of the destination. Likewise, some of the feature points will be correctly paired, such as paired feature points 510A, 510B, 510C. However, some of the paired feature points may not be correctly paired, such as paired feature points 512A, 512B, 512C.

Feature points paired between the first image and the second image should correspond to the same point in the real world destination. For example, paired feature points 510A, 510B each include feature points that correspond to real world positions on the patio 504 of the destination. Likewise, feature point 510C corresponds to feature points of the location identifier 502 represented in each image. In comparison, paired feature points 512A, 512C do not correspond to the same points in the delivery destination. In this example, the feature points of the first image for each of the paired feature points 512A, 512C relates to points on the patio 504 of the destination but the paired feature points of the second image correspond to the tables and chairs 506.

Returning to FIG. 3A, to determine if paired feature points correspond to the same real world position in the destination, a homography is computed between the two paired feature points, as in 312. In projective geometry, a homography exists between points in two-dimensional images if the two points lie in the same three-dimensional plane. If a homography can be computed between the two paired feature points the feature points lie in the same plane and are thus correctly paired. In comparison, if the two feature points do not lie in the same plane (e.g., one feature point corresponds to a position on the patio and one feature point corresponds to a position on the table and chairs) a homography cannot be computed for the paired feature points.

Because a homography exists if two paired feature points lie in the same three-dimensional plane, the process of determining whether a substantially planar area exists within the destination is simplified. Rather than attempting to determine if a planar area exists (e.g., using stereo imaging), the implementations discussed herein assume the area of the destination is planar, pair feature points between images and then compute a homography between paired feature points to confirm whether the paired feature points do indeed lie in the same three-dimensional plane.

If it is determined for a paired feature points that a homography does not exist, the paired feature points are removed from consideration, as in 314. In comparison, if it is determined for paired feature points that a homography exists, the paired feature points are retained, as in 316. After keeping or discarding paired feature points, a determination is made as to whether additional paired feature points are to be confirmed as to whether the points lie in the same three-dimensional plane, as in 318. If it is determined that additional paired feature points are to be confirmed, the example sub-process 300 returns to block 312 and continues for each additional paired feature points. If it is determined that no additional paired feature points are to be confirmed, the example sub-process 300 continues to block 320, discussed with respect FIG. 3B.

Figure 6:
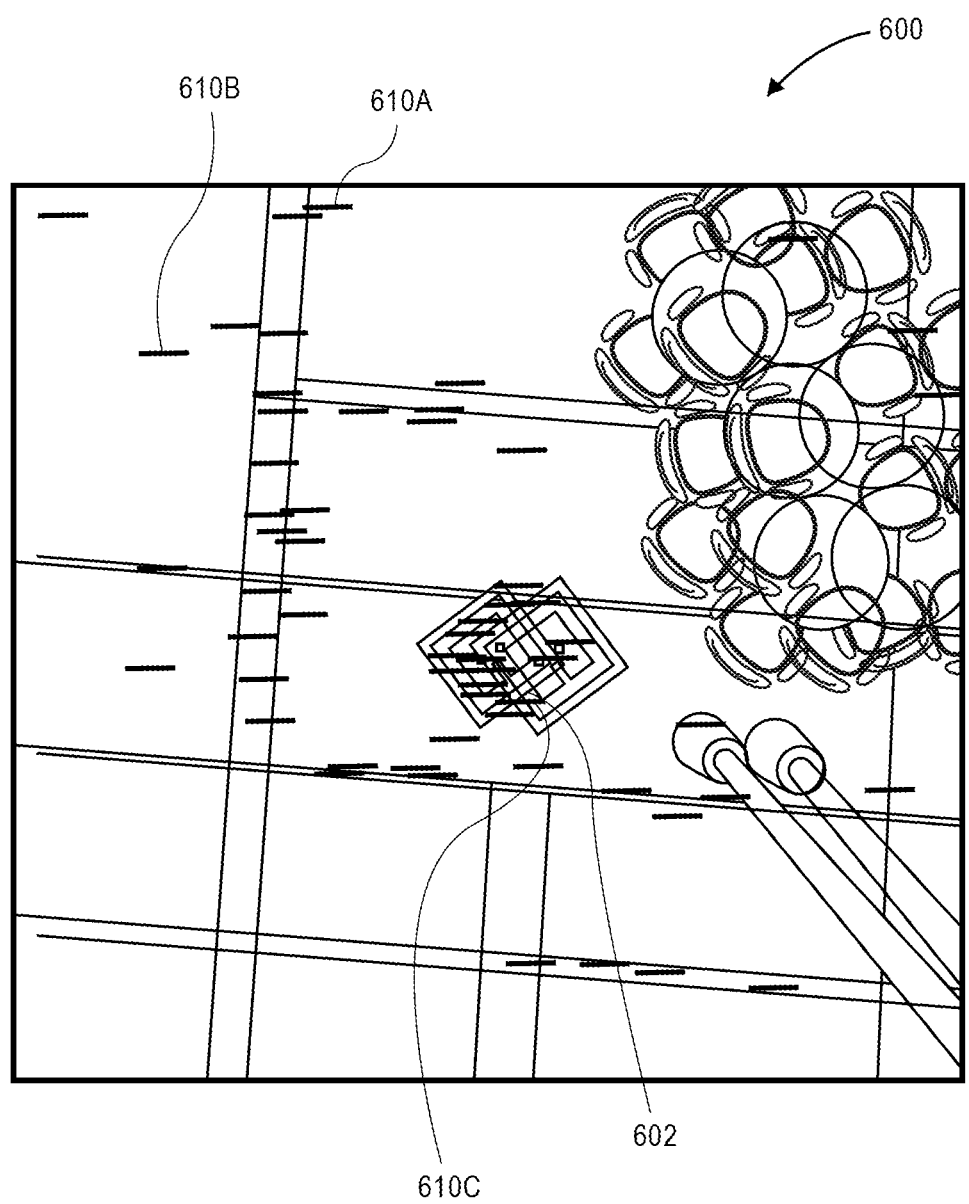
FIG. 6 depicts a representation of the first image of the destination overlaid with the second image of the destination with false paired feature points removed, according to an implementation.

After processing each of the paired feature points to confirm whether each feature point of a pair lie within the same three-dimensional plane, only the paired feature points that are confirmed to lie within the same plane (have a homography) remain. For example, FIG. 6 depicts a representation 600 of the first image of the destination overlaid with the second image of the destination with paired feature points that were incorrectly paired (do not have a homography) removed, according to an implementation. As illustrated, only the paired feature points 610 that correctly pair feature points between the two images are retained for additional processing of the two images. In this example, paired feature points 610A, 610B, 610C are retained because a homography exists between the respective feature points of each pair. In comparison, the paired feature points 512A, 512B, 512C (FIG. 5) are removed because a homography does not exist for the respective feature points of each pair.

As illustrated in FIGS. 5-6, a larger number of paired feature points may exists for the location identifier 602 because the location identifier is of a known shape/size and may be unique. In some implementations, it may be required that at least some of the paired feature points that are retained (e.g., have a homography) correspond to the location identifier. This may be done to ensure that the correct three-dimensional plane is considered when determining if a substantially planar surface exists within the destination.

Returning to FIG. 3B, once paired feature points between the first image and the second image are confirmed to include a homography, the first image and the second image are registered based on the retained paired feature points to generate a registered image set, as in 320. Registering of the first image with the second image results in two images being aligned to a common coordinate system. This may include rotating, scaling, translating, and/or other affine transforms of one or more of the first image or the second image. Registration of the two images may be performed using one or more image registration algorithms.

Figure 7:
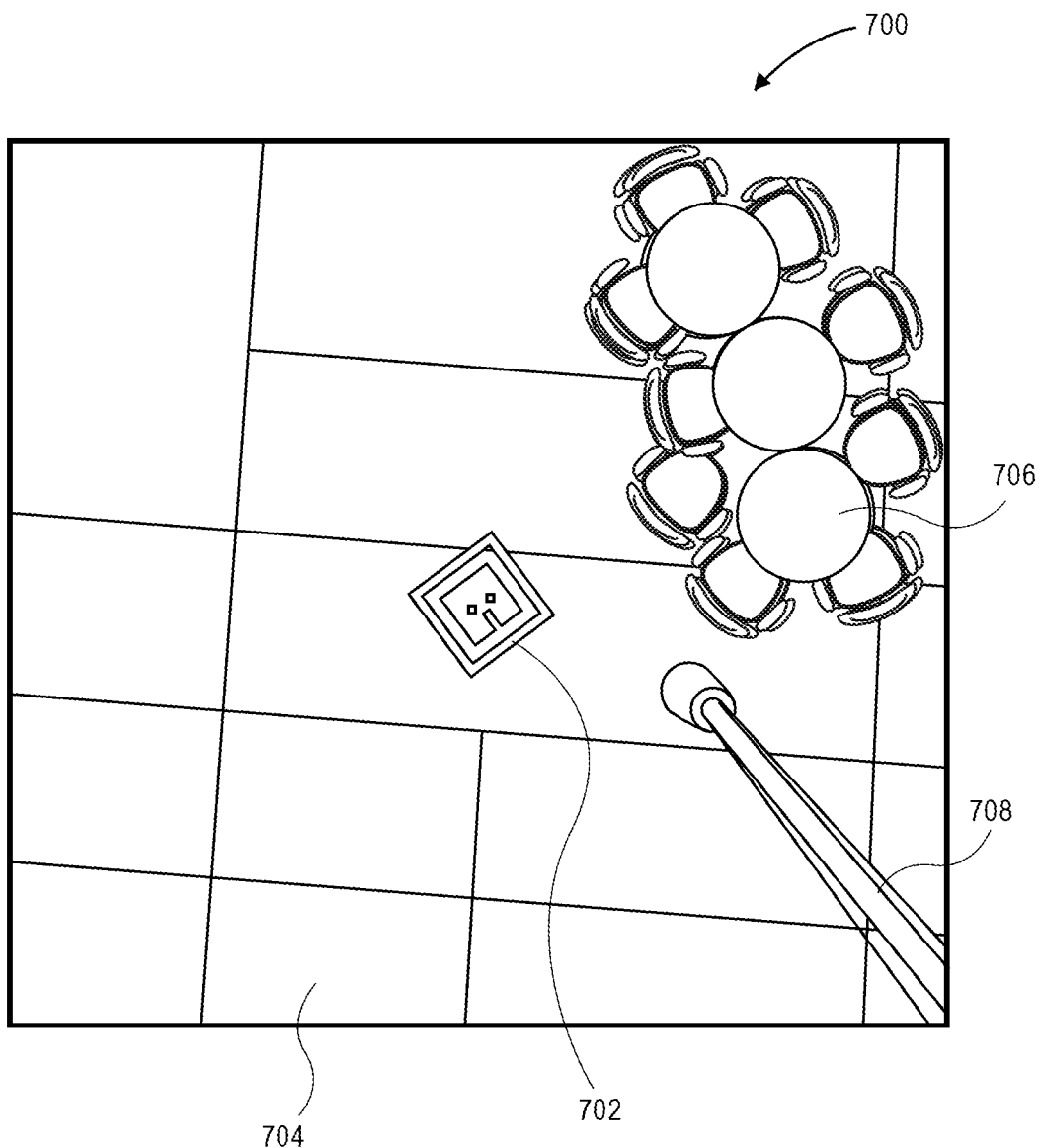
FIG. 7 depicts a representation of a registered image set that includes the first image and the second image registered based on the paired feature points, according to an implementation.

Turning to FIG. 7, illustrated is a representation 700 of the first image of the destination overlaid with the second image of the destination registered based on the paired feature points with a confirmed homography, according to an implementation. As illustrated, once the two images are registered, as discussed above, the resulting representation 700 of the registered image set illustrates that the location identifier 702, lamp 708, the patio 704, and table and chairs 706 are aligned according to the common coordinate system selected for registration of the two images.

Figure 8:
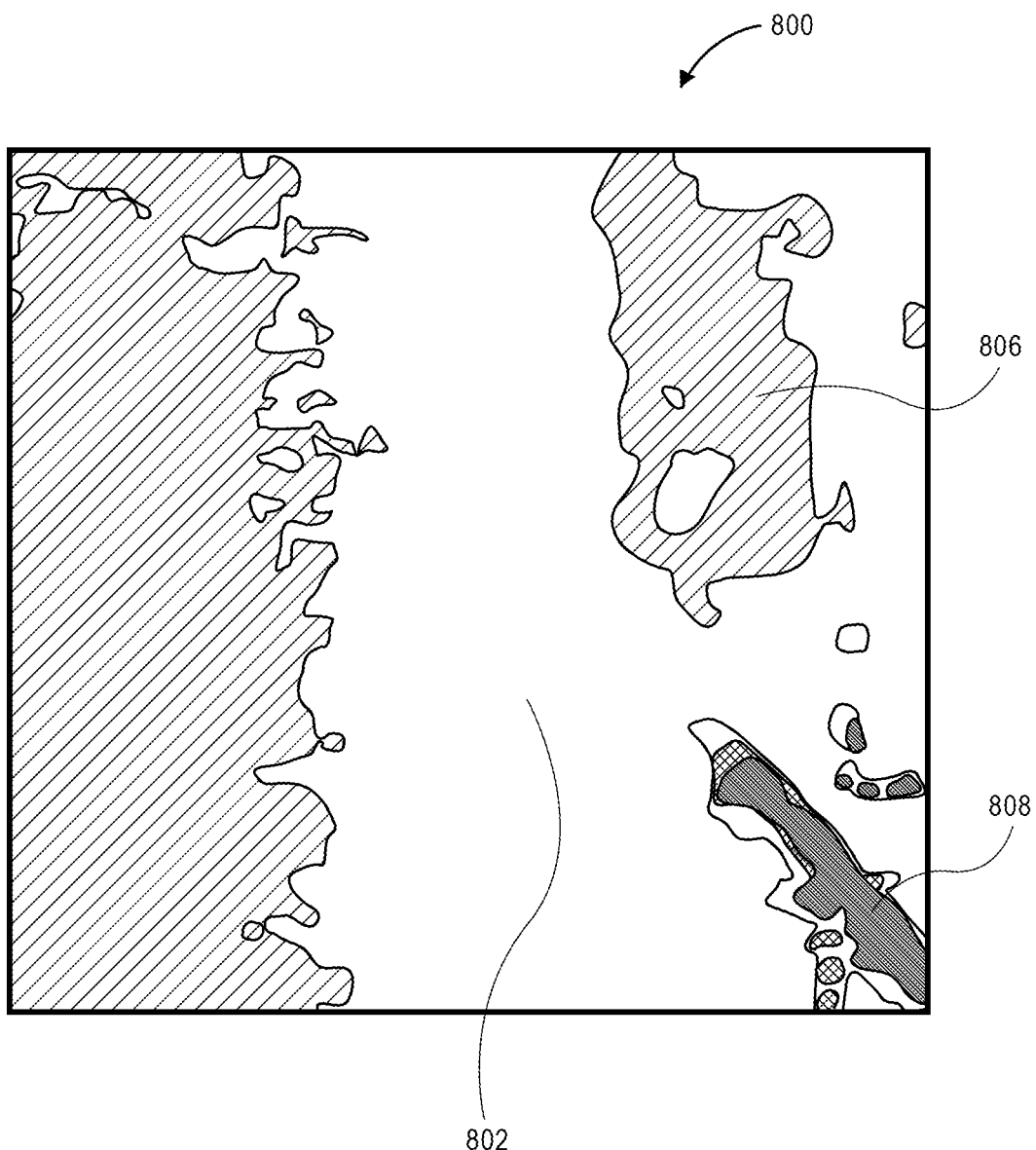
FIG. 8 depicts a representation of a depth disparity map generated from the registered image set, according to an implementation.

Returning to FIG. 3B, a stereo matching algorithm is then applied to the registered image set to generate a depth disparity map, as in 322. For example, FIG. 8 illustrates a representation of a depth disparity map 800 generated from the registered image set of the first image and the second image obtained by the UAV as the UAV descends toward the destination. The depth disparity map 800 provides an illustration of the different depths of objects represented in the registered image set. For example, the portion 802 of the depth disparity map 800 illustrates an area around the location identifier that is a similar distance from the image capture device of the UAV. In comparison, the portion 806 of the depth disparity map 800 identifies that the table and chairs are a different distance from the image capture device.

Likewise, the portion 808 identifies the lamp as being yet another distance from the image capture device.

The depth disparity map generated from the registered image set of the first image and the second image may not provide depth information for each different object represented in the images, but it provides a sufficient level of granularity for use in determining if a substantially planar surface exists within the destination. If additional depth information is desired, the number of paired feature points may be increased to increase the granularity of image registration between the first image and the second image to generate the registered image set.

Returning again to FIG. 3B, a three-dimensional plane may be applied to the depth disparity map, as in 324. For example, the UAV may determine a plane in which the location identifier exists and apply that plane to the depth disparity map. In one example, a distance between the UAV and each paired feature point that correspond to the location identifier may be determined and utilized to define a three-dimensional plane that is applied to the depth disparity map 800 (FIG. 8). Any objects that lie outside the three-dimensional plane may be indicated as out of plane and any objects that lie within the three-dimensional plane may be indicated as in plane. In some implementations, objects within a defined distance or threshold of the three-dimensional plane may be considered to be within the plane and any objects beyond the defined distance or threshold of the three-dimensional plane may be considered to be outside the three-dimensional plane. For example, any point represented in the registered image set that is determined to be within six inches of the three-dimensional plane may be considered to be within the plane. Any point represented in the registered image set that is determined to be beyond six inches of the three-dimensional plane may be considered to be outside the plane.

Figure 9:
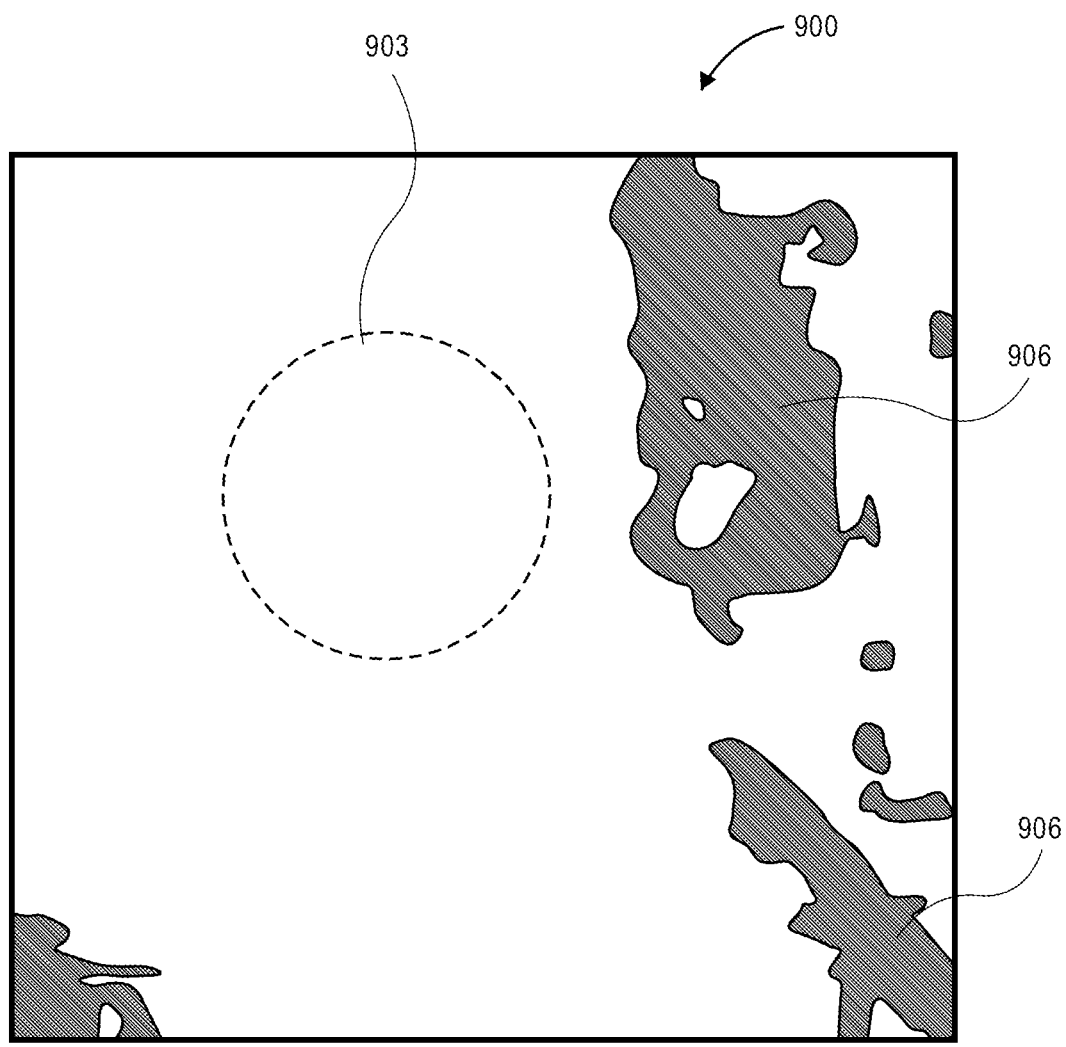
FIG. 9 depicts a representation of objects falling within and outside of a three-dimensional plane surrounding a location identifier, according to an implementation.

FIG. 9 depicts a representation 900 of a portion 902 of the registered image set that is determined to be within a three-dimensional plane defined around the location identifier and portions 906 determined to be outside the three-dimensional plane.

Returning again to FIG. 3B, based on the points determined to be within the three-dimensional plane defined around the location identifier, a determination is made as to whether descent of the UAV is to be aborted, as in 326. It may be determined to abort the descent if, for example, there is not an area within the three-dimensional plane that is of a sufficient size to safely land and/or deploy a payload. In one implementation, as illustrated in FIG. 9, a defined area 903 around the position of the location identifier may be considered to determine whether there is an area within the three-dimensional plane that is of a sufficient size. In other implementations, it may be determined if there is any area of sufficient size within the three-dimensional plane to safely land the UAV and/or deploy a payload.

In another example, points within the three-dimensional plane may be compared for a series of registered image sets generated as part of the UAV descent to determine if an object within the field of view of the image capture device is moving. For example, if a substantially planar surface (area within the three-dimensional plane around the location identifier) exists in a first registered image set but changes in a second registered image set (e.g., a portion appears to be out of plane), it may be determined that an object (e.g., animal) has entered the destination.

If an area of sufficient size within the three-dimensional plane does not exist and/or if it is determined that there is an object moving in the field of view of the image capture device, descent of the UAV is to be aborted. If there is a sufficiently sized area within the three-dimensional place at which the UAV can safely land and/or deploy a payload, descent is not aborted. If it is determined that the descent of the UAV is to be aborted, the example sub-process 300 returns an abort notification, as in 330. If it is determined that the descent of the UAV is not to be aborted, the example sub-process 300 returns a clear notification, as in 328.

The example process 200 and corresponding example sub-process 300 may be performed each time a UAV descends toward a destination to survey the destination and determine whether it is safe to land and/or descend to a defined altitude at the destination without potentially harming any objects positioned at the destination. As discussed above, the example process 200 and corresponding example sub-process may be periodically and/or continually performed during descent of the UAV. In some implementations, images may be used in one more registered image sets. For example, a first image obtained at a first altitude may be registered with a second image obtained at a second, lower altitude. The second image may then be registered with a third image obtained at a third altitude that is lower than the second altitude. Each image registration may be independent of other image registrations. In other implementations, the first image may be considered the source image and all image registrations may be transformed to correspond with the first image.

Figure 10B:
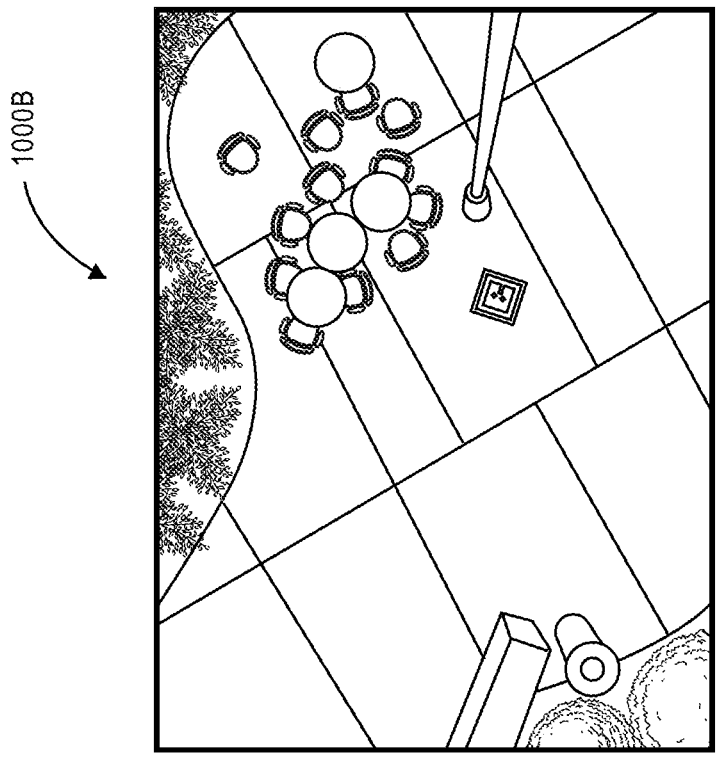
FIG. 10B depicts a representation of a second image of a destination, according to an implementation.
Figure 10A:
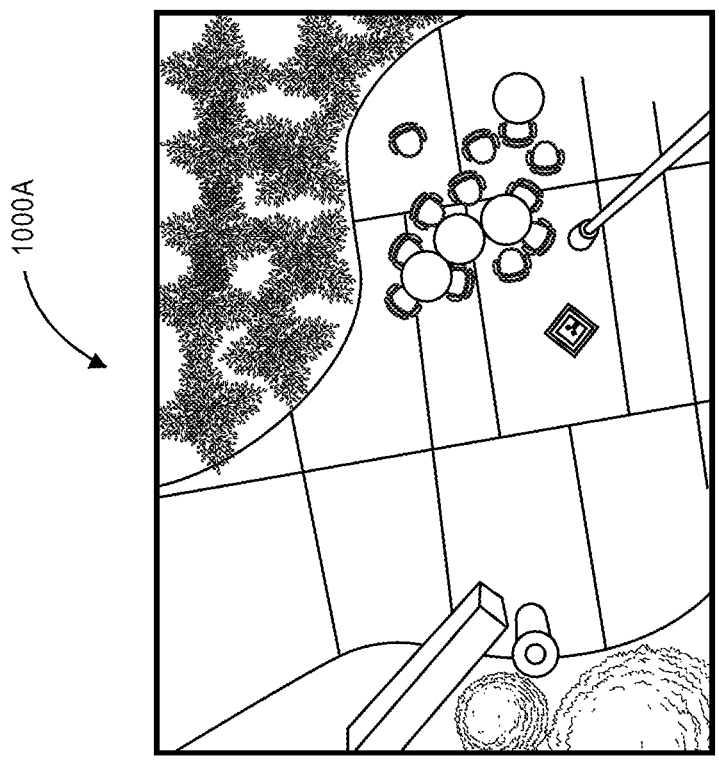
FIG. 10A depicts a representation of a first image of a destination, according to an implementation.

FIGS. 10A-14 provide another representation of registering two images obtained from different altitudes during descent of a UAV to determine if a substantially planar surface exists at the destination, according to an implementation. FIG. 10A illustrates a first image 1000A of the destination and FIG. 10B illustrates a second image 1000B of the destination. The two images 1000A, 1000B are captured by the image capture device of a UAV at different altitudes as the UAV descends toward the destination. The first image 1000A is obtained from a higher altitude than the second image 1000B, as is apparent because the objects represented in the first image 1000A appear smaller than the objects represented in the second image 1000B. Likewise, the pose of the image capture device of the UAV is altered between the two images 1000A, 1000B. However, in each image 1000A, 1000B a representation of the location identifier is included.

Figure 11:
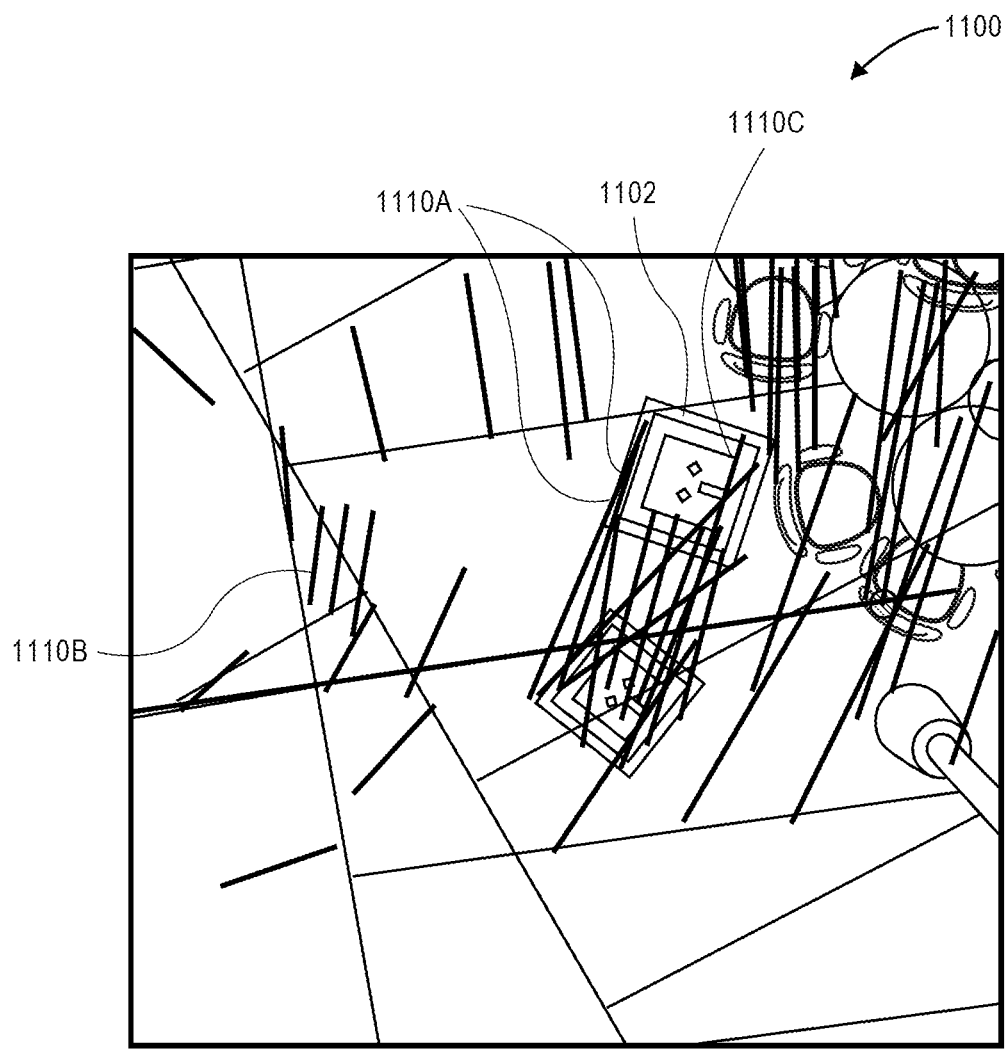
FIG. 11 depicts a representation of the first image of the destination overlaid with the second image of the destination with paired feature points, according to an implementation.

FIG. 11 depicts a representation 1100 of the first image 1000A overlaid with the second image 1000B along with paired feature points 1110A, 1110B, 1110C. Feature points between the two images are determined and paired using the techniques discussed above. Feature points between the two images can still be detected even though the pose of the image capture device between the two images is different. For example, the paired features points corresponding to the location identifier 1102 illustrate the correlation of points between the two images.

Figure 12:
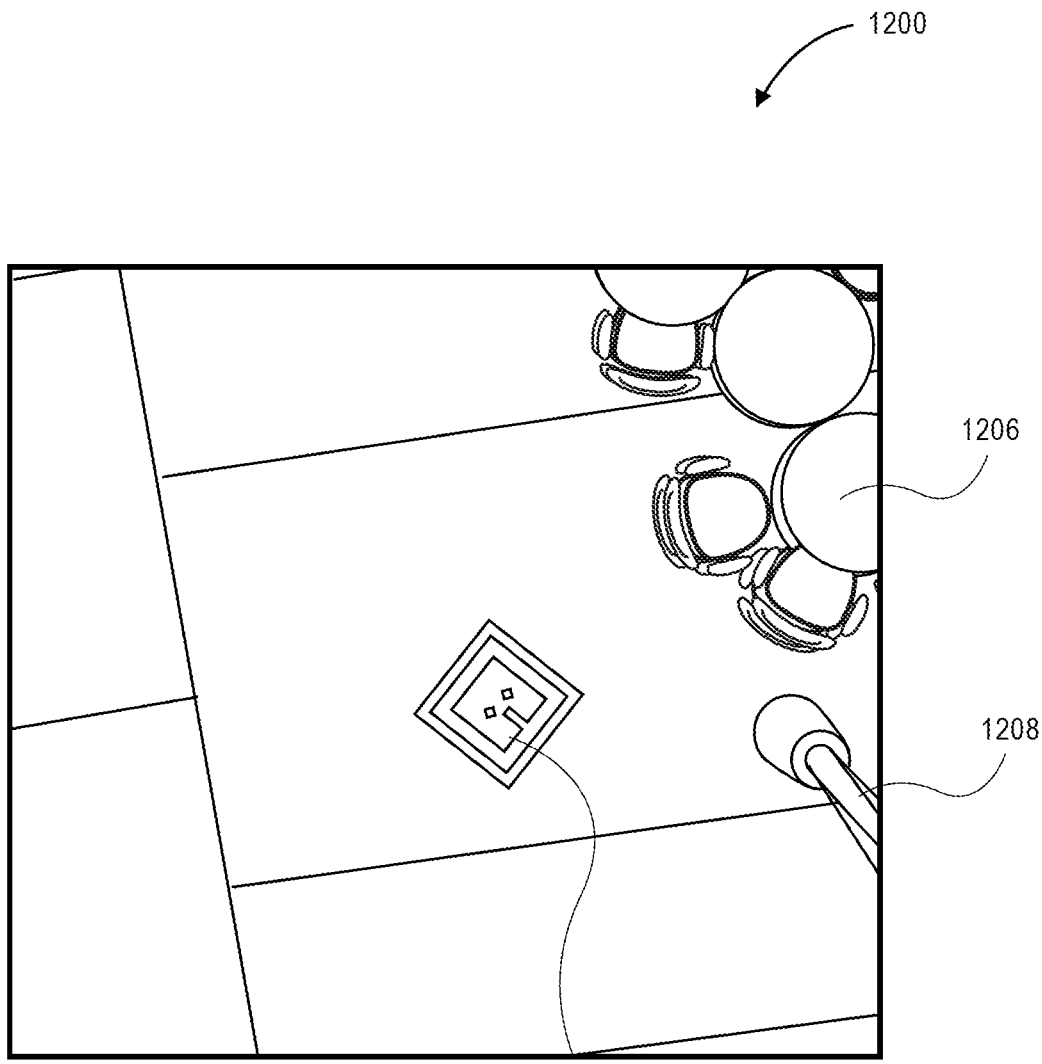
FIG. 12 depicts a representation of a registered image set that includes the first image and the second image registered based on the paired feature points between the first image and the second image, according to an implementation.

Utilizing the paired feature points 1110, the two images are registered to generate a registered image set, as illustrated in FIG. 12. FIG. 12 depicts a representation 1200 of the first image of the destination overlaid with the second image of the destination and registered based on the paired feature points determined between the first image of the destination and the second image of the destination, according to an implementation. As illustrated, the orientation and scale of the two images have been transformed to a single coordinate space so that the registered images are aligned, as illustrated by the alignment of the location identifier 1202, lamp 1208, and tables and chairs 1206. The registration of the two images is accomplished as discussed above with respect to FIGS. 2-3B.

Figure 13:
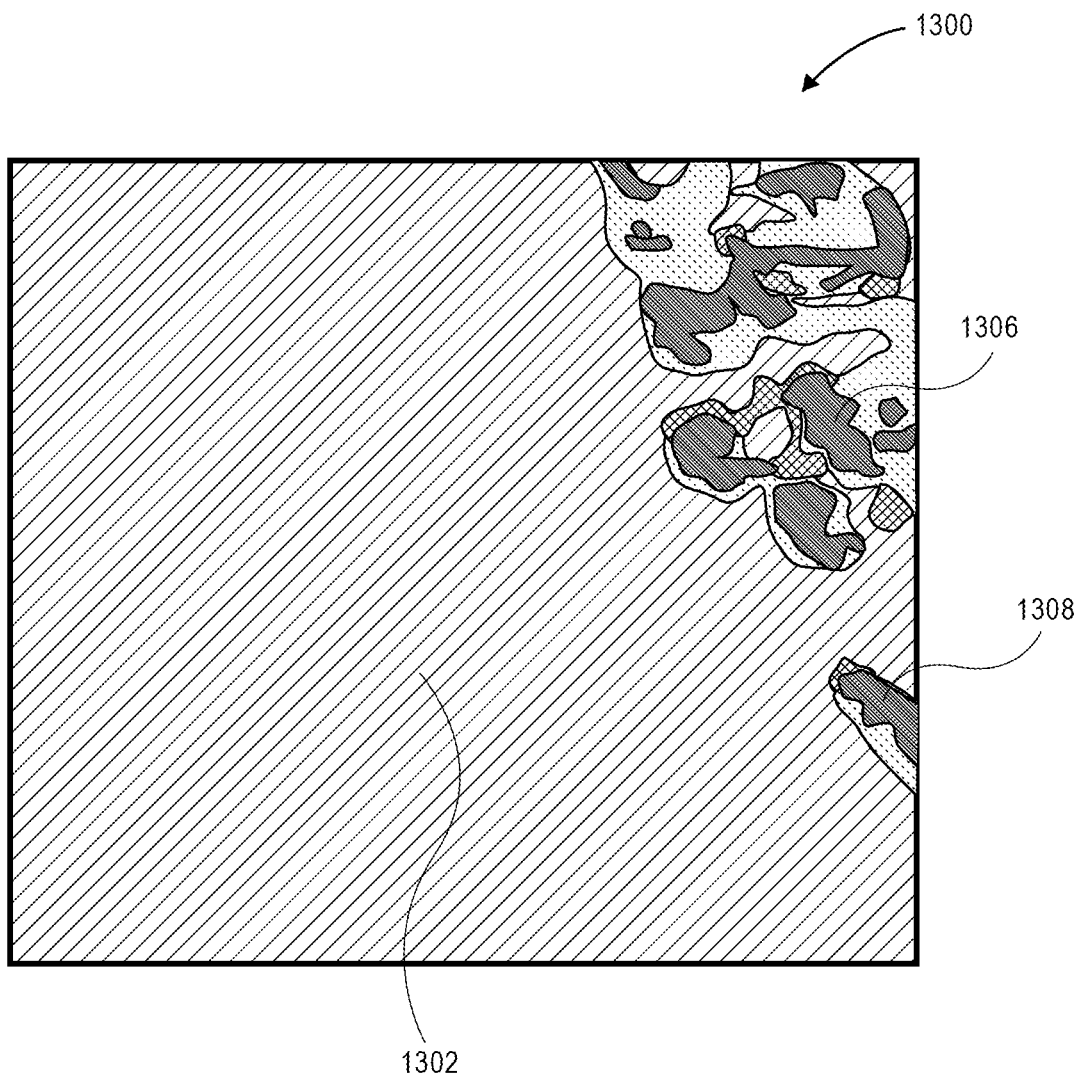
FIG. 13 depicts a representation of a depth disparity map generated from the registered image set, according to an implementation.

As discussed above, a stereo algorithm is applied to the registered image set to generate a depth disparity map representative of the depth information of the points represented in the registered image set. For example, FIG. 13 depicts a representation of a depth disparity map 1300 generated from the registered image set, according to an implementation. The depth disparity map 1300 indicates different depths of different objects within the field of view of the image capture device. For example, the area 1302 around the location identifier is at a first depth, the area 1306 around the table and chairs has a different depth, and the area 1308 corresponding to the position of the lamp has a different depth.

Figure 14:
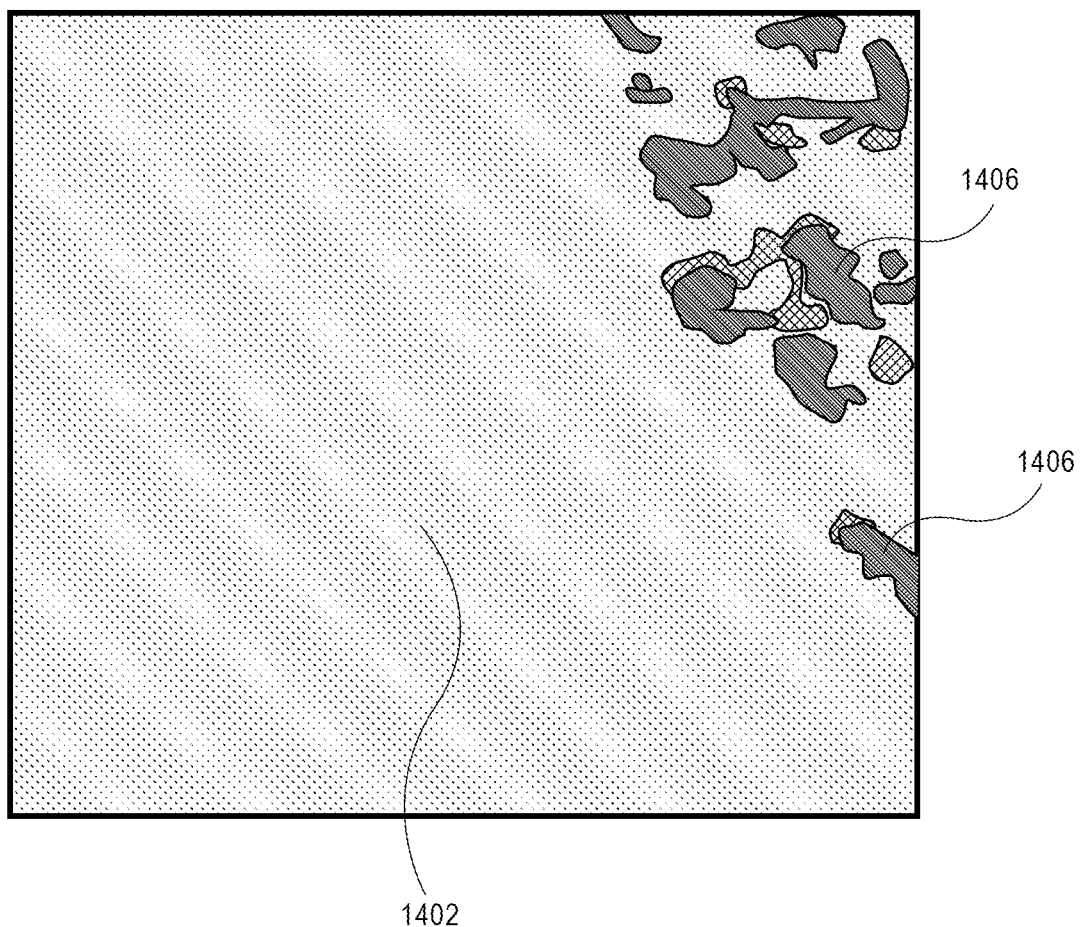
FIG. 14 depicts a representation of a three-dimensional plane surrounding a location identifier, according to an implementation.

Finally, as illustrated in FIG. 14, the a three-dimensional plane corresponding to the location identifier may be applied to the depth disparity map to determine points within the field of view of the image capture device of the UAV that are within the three-dimensional plane and points that fall outside the three-dimensional plane, according to an implementation. For example, the area 1402 corresponds to an area that is considered a substantially parallel surface because it is within the three-dimensional plane around the location identifier. Likewise, the areas 1406 are outside the three-dimensional plane.

Utilizing the information from the three-dimensional plane, as discussed above, it may be determined whether descent of the UAV should be aborted or continue.

As illustrated with the above discussion and examples, images of a destination may be obtained using an image capture device of a UAV as the UAV descends toward a delivery location. The obtained images are processed to determine if descent toward the location can continue or if it should be aborted. The images may be obtained at different altitudes, at different times during the descent, at different poses, etc. By assuming that paired feature points between the two images are within a plane, the assumption can be confirmed by computing or otherwise determining a homography between the two feature points. If the homography can be computed, the two feature points are within the same plane and are retained for use in registering the two images. If a homography cannot be computed from the two feature points, it is determined that the two feature points are not within the same plane and are discarded. Utilizing the retained paired feature points, the images are registered and processed to determine if a substantially planar surface exists at the destination.

Figure 15:
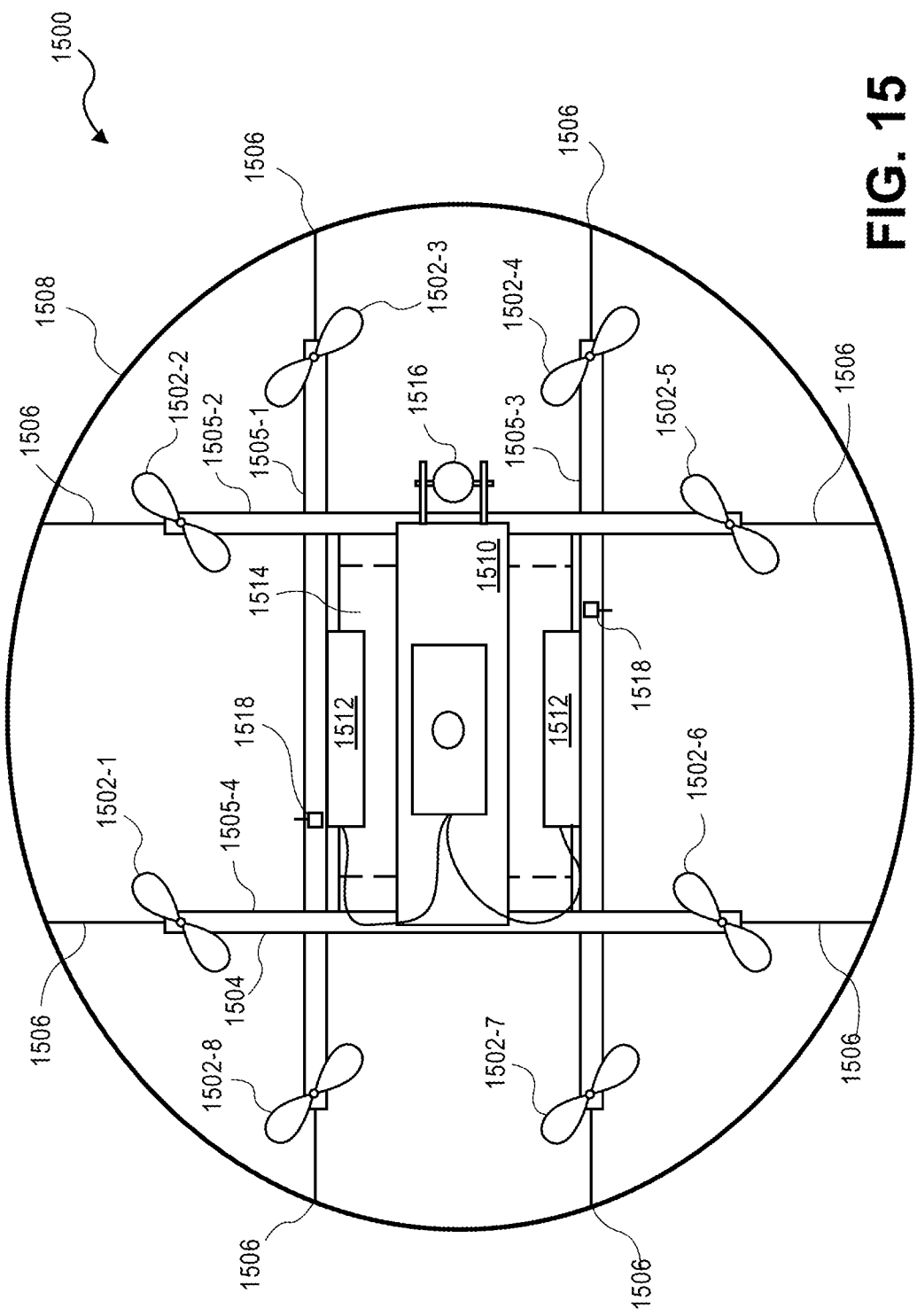
FIG. 15 depicts a block diagram of a top-down view of an unmanned aerial vehicle, according to an implementation.

FIG. 15 illustrates a block diagram of a top-down view of a UAV 1500, according to an implementation. As illustrated, the UAV 1500 includes eight propellers 1502-1, 1502-2, 1502-3, 1502-4, 1502-5, 1502-6, 1502-7, 1502-8 spaced about the frame 1504 of the UAV. The propellers 1502 may be any form of propeller (e.g., graphite, carbon fiber) and of a size sufficient to lift the UAV 1500 and any inventory engaged by the UAV 1500 so that the UAV 1500 can navigate through the air to a destination, such as a delivery destination. While this example includes eight propellers, in other implementations, more or fewer propellers may be utilized. Likewise, in some implementations, the propellers may be positioned at different locations on the UAV 1500. In addition, alternative methods of propulsion may be utilized as "motors" in implementations described herein. For example, fans, jets, turbojets, turbo fans, jet engines, internal combustion engines, and the like may be used (either with propellers or other devices) to propel the UAV.

The frame 1504 of the UAV 1500 may likewise be of any suitable material, such as graphite, carbon fiber, and/or aluminum. In this example, the frame 1504 of the UAV 1500 includes four rigid members 1505-1, 1505-2, 1505-3, 1505-4, or beams arranged in a hash pattern with the rigid members intersecting and joined at approximately perpendicular angles. In this example, rigid members 1505-1 and 1505-3 are arranged substantially parallel to one another and are approximately the same length. Rigid members 1505-2 and 1505-4 are arranged substantially parallel to one another, yet perpendicular to rigid members 1505-1 and 1505-3. Rigid members 1505-2 and 1505-4 are approximately the same length. In some embodiments, all of the rigid members 1505 may be of approximately the same length, while in other implementations, some or all of the rigid members may be of different lengths. Likewise, the spacing and/or orientation between the two sets of rigid members may be approximately the same or different.

While the implementation illustrated in FIG. 15 includes four rigid members 1505 that are joined to form the frame 1504, in other implementations, there may be fewer or more components to the frame 1504. For example, rather than four rigid members, in other implementations, the frame 1504 of the UAV 1500 may be configured to include six rigid members. In such an example, two of the rigid members 1505-2, 1505-4 may be positioned parallel to one another. Rigid members 1505-1, 1505-3 and two additional rigid members on either side of rigid members 1505-1, 1505-3 may all be positioned parallel to one another and perpendicular to rigid members 1505-2, 1505-4. With additional rigid members, additional cavities with rigid members on all four sides may be formed by the frame 1504. As discussed further below, a cavity within the frame 1504 may be configured to include an inventory engagement mechanism for the engagement, transport, and delivery of item(s) and/or containers that contain item(s).

In some implementations, the UAV may be configured to reduce aerodynamic resistance. For example, an aerodynamic housing may be included on the UAV that encloses the UAV control system 1510, one or more of the rigid members 1505, the frame 1504, and/or other components of the UAV 1500. The housing may be made of any suitable material(s) such as graphite, carbon fiber, aluminum, titanium, magnesium, fiberglass, etc. Likewise, in some implementations, the location and/or the shape of the inventory (e.g., item or container) may be aerodynamically designed. For example, in some implementations, the inventory engagement mechanism may be configured such that when the inventory is engaged it is enclosed within the frame and/or housing of the UAV 1500 so that no additional drag is created during transport of the inventory by the UAV 1500. In other implementations, the inventory may be shaped to reduce drag and provide a more aerodynamic design of the UAV and the inventory. For example, if the inventory is a container and a portion of the container extends below the UAV when engaged, the exposed portion of the container may have a curved shape.

The propellers 1502 and corresponding propeller motors are positioned at both ends of each rigid member 1505. The propeller motors may be any form of motor capable of generating enough speed with the propellers to lift the UAV 1500 and any engaged inventory thereby enabling aerial transport of the inventory.

Extending outward from each rigid member is a support arm 1506 that is connected to a safety barrier 1508. In this example, the safety barrier is positioned around and attached to the UAV 1500 in such a manner that the motors and propellers 1502 are within the perimeter of the safety barrier 1508. The safety barrier may be plastic, rubber, etc. Likewise, depending on the length of the support arms 1506 and/or the length, number or positioning of the rigid members 1505, the safety barrier may be round, oval, or any other shape.

Mounted to the frame 1504 is the UAV control system 1510. In this example, the UAV control system 1510 is mounted in the middle and on top of the frame 1504. The UAV control system 1510, as discussed in further detail below with respect to FIG. 16, controls the operation, routing, navigation, communication, descent, and the inventory engagement mechanism of the UAV 1500.

Likewise, the UAV 1500 includes one or more power modules 1512. In this example, the UAV 1500 includes two power modules 1512 that are removably mounted to the frame 1504. The power module(s) for the UAV may be in the form of battery power, solar power, gas power, super capacitor, fuel cell, alternative power generation source, or a combination thereof. The power modules 1512 are coupled to and provide power for the UAV control system 1510 and the propeller motors.

In some implementations, one or more of the power modules may be configured such that it can be autonomously removed and/or replaced with another power module while the UAV is landed. For example, when the UAV lands at a relay location and/or materials handling facility, the UAV may engage with a charging member at the location that will recharge the power module. In some implementations, a container may include a power module and when the engagement mechanism of the UAV engages with the container, the power module of the container may provide power to the UAV. For example, when an item is being delivered to a delivery location, the power module included in the container may be utilized to power the UAV, rather than and/or in addition to the power modules 1512 of the UAV 1500. When the container is disengaged, the power provided by the container is removed and the UAV 1500 operates using power from the UAV power module 1512.

As mentioned above, the UAV 1500 also includes an inventory engagement mechanism 1514. The inventory engagement mechanism may be configured to engage and disengage items and/or containers that hold items (generally referred to as a payload). In this example, the inventory engagement mechanism 1514 is positioned within a cavity of the frame 1504 that is formed by the intersections of the rigid members 1505. In this example, the inventory engagement mechanism is positioned beneath the UAV control system 1510. In implementations with additional rigid members, the UAV may include additional inventory engagement mechanisms and/or the inventory engagement mechanism 1514 may be positioned in a different cavity within the frame 1504. The inventory engagement mechanism may be of any size sufficient to securely engage and disengage containers that contain inventory. In other implementations, the engagement mechanism may operate as the container, containing the inventory item(s) to be delivered.

In some implementations, the inventory engagement mechanism 1514 may include a retractable cable, pulley, or other member that may be extended or lowered from the UAV to place an item or a container containing an item at an inventory location. The inventory engagement mechanism communicates with (via wired or wireless communication) and is controlled by the UAV control system 1510.

The UAV 1500 may also include one or more input/output components. For example, the UAV may include one or more image capture devices, such as cameras 1516 that may be positioned to view and/or obtain images of destinations, delivery locations, location identifiers, etc. For example, the camera 1516 may be mounted on a gimbal that can be used to provide two-axis rotation of the camera with respect to the UAV. The camera may be any type of camera, such as a red, green, blue color camera, a still camera, a video camera, etc.

Likewise, the UAV may include one or more RFID readers 618 that may be powered by the power modules 1518 to detect RFID tags included in a location identifier. Other input/output components that may be included on the UAV 1500 include an audio transducer (speaker), microphone, light sensor, etc.

While the implementations of the UAV discussed herein utilize propellers to achieve and maintain flight, in other implementations, the UAV may be configured in other manners. For example, the UAV may include fixed wings and/or a combination of both propellers and fixed wings. For example, the UAV may utilize one or more propellers to enable takeoff and landing and a fixed wing configuration or a combination wing and propeller configuration to sustain flight while the UAV is airborne.

Figure 16:
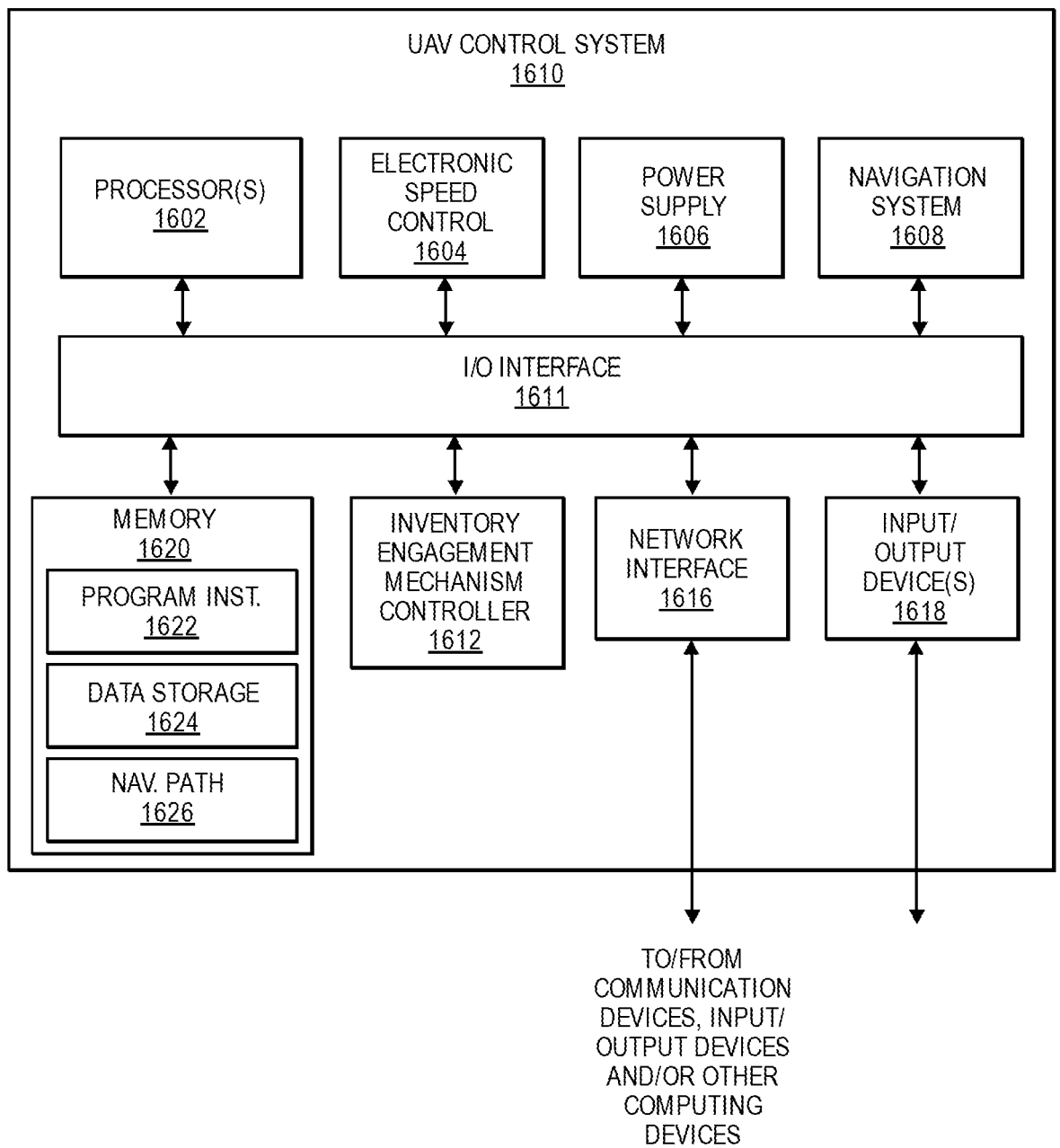
FIG. 16 is a block diagram illustrating various components of an unmanned aerial vehicle control system, according to an implementation.

FIG. 16 is a block diagram illustrating an example UAV control system 1610 of the UAV 1500. In various examples, the block diagram may be illustrative of one or more aspects of the UAV control system 1610 that may be used to implement the various systems and methods discussed above. In the illustrated implementation, the UAV control system 1610 includes one or more processors 1602, coupled to a non-transitory computer readable storage medium 1620 via an input/output (I/O) interface 1611. The UAV control system 1610 may also include a propeller motor controller 1604, such as an electronic speed control (ESC), a power module 1606, and/or a navigation system 1608. The UAV control system 1610 further includes an inventory engagement mechanism controller 1612, a network interface 1616, and one or more input/output devices 1618.

In various implementations, the UAV control system 1610 may be a uniprocessor system including one processor 1602, or a multiprocessor system including several processors 1602 (e.g., two, four, eight, or another suitable number). The processor(s) 1602 may be any suitable processor capable of executing instructions. For example, in various implementations, the processor(s) 1602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1602 may commonly, but not necessarily, implement the same ISA.

The non-transitory computer readable storage medium 1620 may be configured to store executable instructions, data, navigation paths, and/or data items accessible by the processor(s) 1602. In various implementations, the non-transitory computer readable storage medium 1620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1620 as program instructions 1622, data storage 1624 and navigation path data 1626, respectively. In other implementations, program instructions, data, and/or navigation paths may be received, sent, or stored upon different types of computer-accessible media, such as non-transitory media, or on similar media separate from the non-transitory computer readable storage medium 1620 or the UAV control system

1610. Generally speaking, a non-transitory, computer readable storage medium may include storage media or memory media such as magnetic or optical media, e.g., disk or CD/DVD-ROM, coupled to the UAV control system 1610 via the I/O interface 1611. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1616.

In one implementation, the I/O interface 1611 may be configured to coordinate I/O traffic between the processor(s) 1602, the non-transitory computer readable storage medium 1620, and any peripheral devices, the network interface 1611 or other peripheral interfaces, such as input/output devices 1618. In some implementations, the I/O interface 1611 may perform any necessary protocol, timing or other data transformations to convert data signals from one component (e.g., non-transitory computer readable storage medium 1620) into a format suitable for use by another component (e.g., processor(s) 1602). In some implementations, the I/O interface 1611 may include support for devices attached through various types of peripheral buses, such as a variant of the Peripheral Component Interconnect (PCI) bus standard or the Universal Serial Bus (USB) standard, for example. In some implementations, the function of the I/O interface 1611 may be split into two or more separate components, such as a north bridge and a south bridge, for example. Additionally, in some implementations, some or all of the functionality of the I/O interface 1611, such as an interface to the non-transitory computer readable storage medium 1620, may be incorporated directly into the processor(s) 1602.

The propeller motor(s) controller 1604 communicates with the navigation system 1608 and adjusts the power of each propeller motor to guide the UAV along a determined navigation path to a destination. The navigation system 1608 may include a GPS or other similar system than can be used to navigate the UAV to and/or from a destination. The inventory engagement mechanism controller 1612 communicates with the motor(s) (e.g., a servo motor) used to engage and/or disengage inventory. For example, when the UAV is positioned over a destination at a defined altitude (or landed), the inventory engagement mechanism controller 1612 may provide an instruction to a motor that controls the inventory engagement mechanism to release the inventory.

The network interface 1616 may be configured to allow data to be exchanged among the UAV control system 1610, other devices attached to a network, such as other computer systems, and/or with UAV control systems of other UAVs. For example, the network interface 1616 may enable wireless communication between numerous UAVs that are transporting inventory to various destinations. In various implementations, the network interface 1616 may support communication via wireless general data networks, such as a Wi-Fi network. For example, the network interface 1616 may support communication via telecommunications networks such as cellular communication networks, satellite networks, and the like.

Input/output devices 1618 may, in some implementations, include one or more displays, image capture devices (e.g. camera), thermal sensors, infrared sensors, time of flight sensors, accelerometers, pressure sensors, weather sensors, RFID reader, microphone, etc. Multiple input/output devices 1618 may be present and controlled by the UAV control system 1610.

As shown in FIG. 16, the memory 1620 may include program instructions 1622 that may be configured to implement the example processes and/or sub-processes described above. The data storage 1624 may include various data stores for maintaining data items that may be provided for determining navigation paths, retrieving inventory, landing, identifying a destination, identifying a location identifier, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 1610 is merely illustrative and is not intended to limit the scope of the present disclosure. The UAV control system 1610 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 1610 may be transmitted to the UAV control system 1610 via transmission media or signals such as electrical, electromagnetic, or digital signals, conveyed via a communication medium such as a wireless network. Various implementations may further include receiving, sending, or storing instructions and/or data implemented in accordance with the foregoing description upon a computer-accessible medium. Accordingly, the techniques described herein may be practiced with other UAV control system configurations.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   obtaining, with a camera of an aerial vehicle at a first altitude above a destination, a first image of the destination, wherein the first image includes a first representation of a delivery location identifier;
   subsequent to obtaining the first image, descending, with the aerial vehicle, in altitude toward the destination;
   obtaining, with the camera of the aerial vehicle at a second altitude above the destination, a second image of the destination, wherein the second image includes a second representation of the delivery location identifier;
   registering the first image and the second image, based at least in part on a plurality of feature points of the delivery location identifier detected in each of the first image and the second image;
   generating a depth disparity map of the destination based at least in part on the registered first image and second image; and
   determining, based at least in part on the depth disparity map, a plane at the destination;
   determining that the plane includes an area of sufficient size to accept at least one of a package from the aerial vehicle or the aerial vehicle; and
   continuing to descend, with the aerial vehicle, toward the destination.

2. The method of claim 1, further comprising:
   obtaining, with the camera of the aerial vehicle at a third altitude above the destination, a third image of the destination;
   processing the second image and the third image to detect an object; and
   in response to detecting the object, aborting descent of the aerial vehicle.

3. The method of claim 1, further comprising:
   determining that a target altitude of the aerial vehicle has been achieved; and
   in response to determining that the target altitude has been achieved, complete a delivery of the package carried by the aerial vehicle.

4. A computer-implemented method, comprising:
   under control of one or more computing systems configured with executable instructions,
      causing an aerial vehicle to descend toward a destination;
      causing an image capture device of the aerial vehicle to obtain a first image of the destination when the aerial vehicle is at a first position, wherein the first image includes a first representation of a delivery location identifier;
      causing the image capture device of the aerial vehicle to obtain a second image of the destination when the aerial vehicle is at a second position that is different than the first position, wherein the second image includes a second representation of the delivery location identifier;
      registering the first image and the second image, based at least in part on a plurality of feature points of the delivery location identifier detected in each of the first image and the second image;
      generating a depth disparity map of the destination based at least in part on the registered first image and second image; and
      determining, based at least in part on the depth disparity map, that a substantially planar surface is available at the destination; and
      causing, in response to determining that the substantially planar surface is available at the destination, the aerial vehicle to continue to descend toward the destination.

5. The computer-implemented method of claim 4, wherein the substantially planar surface determined to be available at the destination is of sufficient size to accept at least one of a package from the aerial vehicle or the aerial vehicle.

6. The computer-implemented method of claim 4, wherein the plurality of feature points includes a first plurality of feature points of the first image; and
   the computer-implemented method further comprising:
      for each of the first plurality of feature points of the first image, associating a feature point of the first plurality of feature points with a corresponding feature point of the second image to form paired feature points that include the feature point of the first image and the corresponding feature point of the second image;
      determining a first plurality of paired feature points in which the feature point of the first image and the corresponding feature point of the second image are in a same plane; and
      wherein registering the first image and the second image is based at least in part on the first plurality of paired feature points.

7. The computer-implemented method of claim 6, wherein determining a first plurality of paired feature points in which the feature point of the first image and the corresponding feature point of the second image are in the same plane, further includes:
   for each paired feature point:

determining a homography between the feature point of the first image and the corresponding feature point of the second image.

8. The computer-implemented method of claim 4, further comprising one or more of:
processing a third image to determine a visual identifier included at the destination;
detecting a radio frequency identification tag at the destination; or
detecting a sound emitted from the destination.

9. The computer-implemented method of claim 4, wherein generating a depth disparity map includes:
applying a stereo matching algorithm to the first image and the second image to generate the depth disparity map.

10. The computer-implemented method of claim 4, wherein processing the first image and the second image includes:
defining a plane within the destination; and
determining that the substantially planar surface is within the plane.

11. The computer-implemented method of claim 4, further comprising:
determining that the aerial vehicle has completed descent toward the destination; and
causing the aerial vehicle to release a payload at the destination, wherein the payload includes an item ordered from an electronic commerce website.

12. The computer-implemented method of claim 4, further comprising:
causing the image capture device of the aerial vehicle to obtain a third image of the destination when the aerial vehicle is in a third position;
processing the third image to detect an object; and
in response to detecting the object, aborting descent of the aerial vehicle.

13. The computer-implemented method of claim 12, further comprising:
determining that the object is within a defined distance of the delivery location identifier.

14. A computing system, comprising:
one or more processors; and
a memory coupled to the one or more processors and storing program instructions that, when executed by the one or more processors, cause the one or more processors to at least:
cause an aerial vehicle to descend toward a destination;
cause a camera of the aerial vehicle to obtain a first image of the destination when the aerial vehicle is at a first position, wherein the first image includes a first representation of a delivery location identifier;
cause the camera of the aerial vehicle to obtain a second image of the destination when the aerial vehicle is at a second position, wherein the second image includes a second representation of the delivery location identifier;
register the first image and the second image, based at least in part on a plurality of feature points of the delivery location identifier detected in each of the first image and the second image;
generate a depth disparity map of the destination based at least in part on the registered first image and second image; and
determine, based at least in part on the depth disparity map, that a substantially planar surface is available at the destination; and
cause, in response to a determination that the substantially planar surface is available at the destination, the aerial vehicle to continue to descend toward the destination.

15. The computing system of claim 14, wherein the substantially planar surface determined to be available at the destination is of sufficient size to accept at least one of a package from the aerial vehicle or the aerial vehicle.

16. The computing system of claim 14, wherein a pose of the camera is altered between the first image and the second image.

17. The computing system of claim 14, wherein the program instructions, that when executed by the one or more processors, further cause the one or more processors to at least:
process a third image to determine a visual identifier at the destination;
detect a radio frequency identification tag at the destination; or
detect a sound emitted from the destination.

18. The computing system of claim 14, further comprising program instructions that when executed by the one or more processors, further cause the one or more processors to at least:
cause the camera of the aerial vehicle to obtain a third image of the destination when the aerial vehicle is at a third position;
determine, based at least in part on a comparison between the second image and the third image, that an object is within the substantially planar surface; and
cause the aerial vehicle to stop descending toward the destination.

* * * * *